(12) United States Patent
Garthwaite

(10) Patent No.: US 6,999,979 B2
(45) Date of Patent: Feb. 14, 2006

(54) EFFICIENT ENCODING OF REFERENCES INTO A COLLECTION SET

(75) Inventor: Alexander T. Garthwaite, Beverly, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 486 days.

(21) Appl. No.: 10/288,608

(22) Filed: Nov. 5, 2002

(65) Prior Publication Data

US 2004/0088339 A1 May 6, 2004

(51) Int. Cl.
G06F 12/12 (2006.01)
(52) U.S. Cl. .................................................... 707/206
(58) Field of Classification Search ............... 707/206, 707/205, 103 R, 103 Y, 102, 103 Z, 103; 718/104, 1; 711/159
See application file for complete search history.

(56) References Cited

U.S. PATENT DOCUMENTS

| | | | | |
|---|---|---|---|---|
| 4,797,810 A | * | 1/1989 | McEntee et al. | 707/206 |
| 4,912,629 A | * | 3/1990 | Shuler, Jr. | 707/206 |
| 4,989,134 A | * | 1/1991 | Shaw | 707/206 |
| 5,392,432 A | * | 2/1995 | Engelstad et al. | 707/103 R |
| 5,845,298 A | * | 12/1998 | O'Connor et al. | 707/206 |
| 5,857,210 A | * | 1/1999 | Tremblay et al. | 707/206 |
| 5,873,105 A | * | 2/1999 | Tremblay et al. | 707/206 |
| 5,900,001 A | * | 5/1999 | Wolczko et al. | 707/206 |
| 5,903,900 A | * | 5/1999 | Knippel et al. | 707/206 |
| 5,953,736 A | * | 9/1999 | O'Connor et al. | 711/6 |
| 6,047,125 A | * | 4/2000 | Agesen et al. | 717/148 |
| 6,065,020 A | * | 5/2000 | Dussud | 707/206 |
| 6,148,310 A | * | 11/2000 | Azagury et al. | 707/206 |
| 6,173,294 B1 | * | 1/2001 | Azagury et al. | 707/206 |
| 6,442,661 B1 | * | 8/2002 | Dreszer | 711/170 |

OTHER PUBLICATIONS

Alain Azagury, "Combining Card Marketing with Rembered Sets: How to Save Scanning Time" Vancouver, British Columbia, Canada, pp. 10-19, 1998, ACM, ISBN:1-58113-114-3.*

Jones and Lins, "Garbage Collection: Algorithms for Automatic Dynamic Memory Management," 1996, pp. 165-179, Wiley, New York.

Paul Wilson, "Uniprocessor Garbage Collection Techniques," Technical Report, University of Texas, 1994, pp. 1-67.

Hudson and Moss, "Incremental Collection of Mature Objects," Proceedings of International Workshop on Memory Management, 1992, Springer-Verlag, pp. 1-16.

Grarup and Seligmann, "Incremental Mature Garbage Collection," M.Sc. Thesis, Available at http://www.daimi.au.dk/~jacobse/Papers/ pp. 1-198.

(Continued)

*Primary Examiner*—Paul L. Rodriguez
*Assistant Examiner*—Luke Osborne
(74) *Attorney, Agent, or Firm*—Kudirka & Jobse, LLP

(57) ABSTRACT

In a garbage collector that employs the train algorithm, remembered sets are employed to record the locations of references to objects in a train car in objects outside the car. During each collection, remembered set entries are processed to find the locations of references into the cars yet to be collected. The found locations are stored in scratch-pad lists, and each entry in that list includes a mode indicator that specifies whether the entry represents a single reference location or the locations of more than one reference. One possible value of the mode indicator indicates that the entry consists of two computer words rather than one, the second computer word containing a list of offsets into a region specified by the first word. Another possible mode-indicator value indicates that a region contains references, but it does not specify where within the region those references occur.

28 Claims, 27 Drawing Sheets

OTHER PUBLICATIONS

Seligmann and Grarup, "Incremental Mature Garbage Collection Using the Train Algorithm," Proceedings of ECOOP '95, Ninth European Conference on Object-Oriented Programming, 1995, http://daimi.au.dk/~jacobse/Papers/ pp. 1-18.

Clark and Mason, "Compacting Garbage Collection can be Fast and Simple," Software-Practice and Experience, Feb. 1996, pp. 177-194, vol. 26, No. 2.

Henry Baker, "List Processing in Real Time on a Serial Computer," Communications of the ACM 21, Apr. 4, 1978, pp. 280-294.

Appel, Ellis, and Li, "Real-time Concurrent Collection on Stock Multiprocessors," ACM SIGPLAN Notices, 1988, pp. 1-24.

Rodney A. Brooks, "Trading Data Space for Reduced Time and Code Space in Real-Time Garbage Collection on Stock Hardware," Proceedings of the 1984 ACM Symposium on Lisp and Functional Programming, pp. 108-113, Aug. 1984, Austin, Texas.

Herlihy and Moss, "Lock-Free Garbage Collection for Multiprocessors," ACM SPAA, 1991, pp. 229-236.

Bacon, Attanasio, Lee, Rajan, and Smith, "Java without the Coffee Breaks: A Nonintrusive Multiprocessor Garbage Collector," SIGPLAN Conference on Programming Language Design and Implementation, Snowbird, Utah, Jun. 2001, pp. 1-12.

James Stamos, "Static Grouping of Small Objects to Enhance Performance of a Paged Virtual Memory," ACM Transactions on Computer Systems, vol. 2, No. 2, pp. 155-180, May 1984.

David, A. Moon, "Garbage Collection in a Large Lisp System," Conference Record of the 1984 ACM Symposium on LISP and Functional Programming, Austin, Texas, Aug. 1984, pp. 235-246.

Robert Courts, "Improving Locality of Reference in a Garbage-Collecting Memory Management System," Communications of the ACM, Sep. 1988, pp. 1128-1138, vol. 31, No. 9.

Wilson, Lam, and Moher, "Effective Static-Graph Reorganization to Improve Locality in Garbage Collected Systems," Proceedings of ACM SIGPLAN Conference on Programming Language Design and Implementation, Jun. 1991, Toronto, Ontario, Canada, pp. 1-15.

Lam, Wilson, and Moher, "Object Type Directed Garbage Collection to Improve Locality," Proceedings of the International Workshop on Memory Management, '92, St. Malo, France, Sep. 1992, pp. 404-425.

Chilimbi and Larus, "Using Generational Garbage Collection to Implement Cache-Conscious Data Placement," International Symposium on Memory Management, Oct. 1998, pp. 1-12.

Lieberman and Hewitt, "A real-time garbage collector based on the lifetimes of objects," Communications of the ACM, 1983, pp. 419-429, vol. 26, No. 6.

David Ungar, "Generation Scavenging: A Non-Disruptive High Performance Storage Reclamation Algortihm," ACM SIGPLAN Notices, Apr. 1984, pp. 157-167, vol. 19, No. 5.

Andrew W. Appel, "Simple Generational Garbage Collection and Fast Allocation," Software Practice and Experience, 1989, pp. 171-183, vol. 19, No. 2.

Hudson and Diwan, "Adaptive Garbage Collection for Modula-3 and Smalltalk," in OOPSLA/ECOOP Workshop on Garbage Collection in Object-Oriented Systems, Oct. 1990, Edited by Eric Jul and Niels-Cristial Juul. pp. 1-5.

Hudson and Hosking, "Remembered sets can also play cards," in OOPSLA/ECOOP Workshop on Garbage Collection in Object-Oriented Systems, Oct. 1993 Edited by Moss, Wilson, and Zorn, pp. 1-8.

Hosking and Moss, "Protection traps and alternatives for memory management of an object-oriented language," ACM Proceedings of the Fourteenth ACM Symposium on Operating Systems Principles, Dec. 1993, pp. 106-119, vol. 27, No. 5.

Hosking, Moss, and Stefanovic, "A Comparative Performance Evaluation of Write Barrier Implementation," in OOPSLA ACM Conference on Object-Oriented Programming, Systems, Languages, and Applications, Oct. 1992, pp. 92-109, vol. 27, No. 10, ACM SIGPLAN Notices, Vancouver, BC, ACM Press.

Patrick G. Sobalvarro, "A Lifetime-based Garbage Collector for LISP Systems on General-Purpose Computers," Massachusetts Institute of Technology, AITR-1417, 1988, pp. 1-70.

* cited by examiner

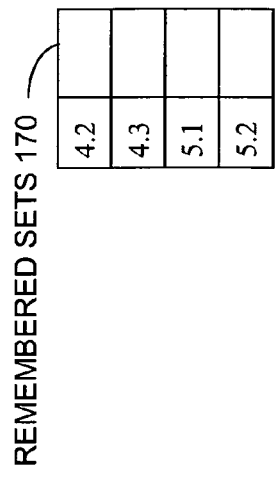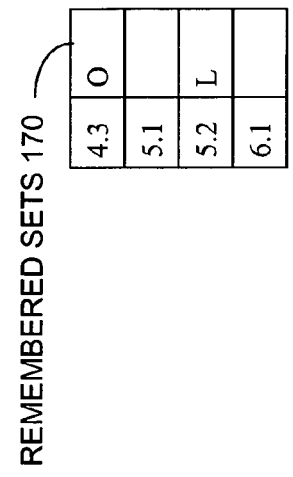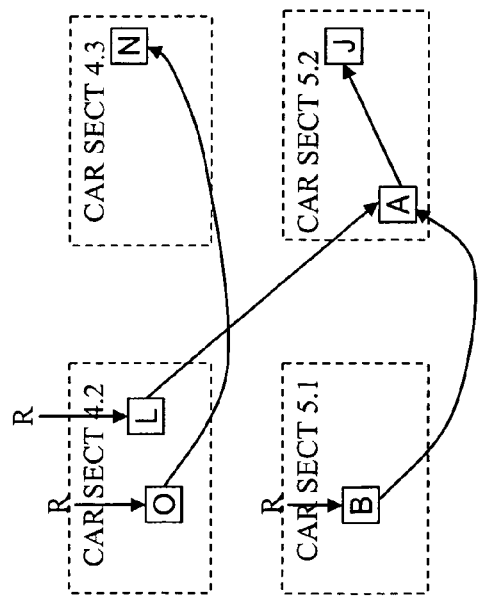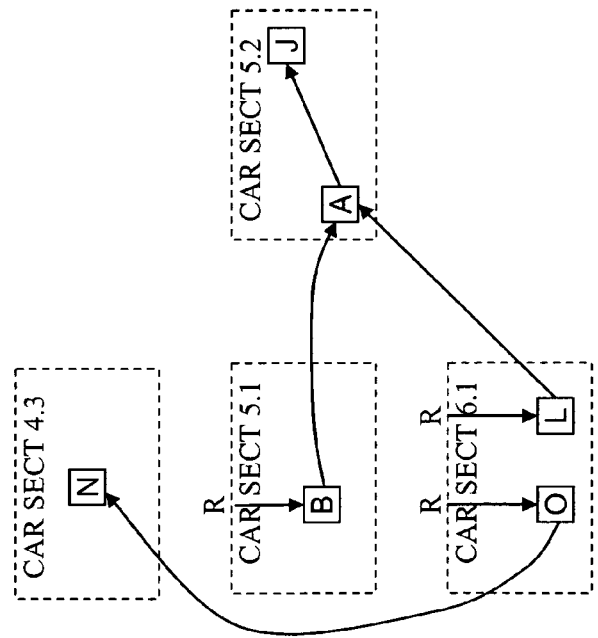
FIG. 12I (Prior Art)
FIG. 12J (Prior Art)

EFFICIENT ENCODING OF REFERENCES INTO A COLLECTION SET

BACKGROUND OF THE INVENTION

1. Field of the Invention

The present invention is directed to memory management. It particularly concerns what has come to be known as "garbage collection."

2. Background Information

In the field of computer systems, considerable effort has been expended on the task of allocating memory to data objects. For the purposes of this discussion, the term object refers to a data structure represented in a computer system's memory. Other terms sometimes used for the same concept are record and structure. An object may be identified by a reference, a relatively small amount of information that can be used to access the object. A reference can be represented as a "pointer" or a "machine address," which may require, for instance, only sixteen, thirty-two, or sixty-four bits of information, although there are other ways to represent a reference.

In some systems, which are usually known as "object oriented," objects may have associated methods, which are routines that can be invoked by reference to the object. They also may belong to a class, which is an organizational entity that may contain method code or other information shared by all objects belonging to that class. In the discussion that follows, though, the term object will not be limited to such structures; it will additionally include structures with which methods and classes are not associated.

The invention to be described below is applicable to systems that allocate memory to objects dynamically. Not all systems employ dynamic allocation. In some computer languages, source programs must be so written that all objects to which the program's variables refer are bound to storage locations at compile time. This storage-allocation approach, sometimes referred to as "static allocation," is the policy traditionally used by the Fortran programming language, for example.

Even for compilers that are thought of as allocating objects only statically, of course, there is often a certain level of abstraction to this binding of objects to storage locations. Consider the typical computer system 10 depicted in FIG. 1, for example. Data, and instructions for operating on them, that a microprocessor 11 uses may reside in on-board cache memory or be received from further cache memory 12, possibly through the mediation of a cache controller 13. That controller 13 can in turn receive such data from system read/write memory ("RAM") 14 through a RAM controller 15 or from various peripheral devices through a system bus 16. The memory space made available to an application program may be "virtual" in the sense that it may actually be considerably larger than RAM 14 provides. So the RAM contents will be swapped to and from a system disk 17.

Additionally, the actual physical operations performed to access some of the most-recently visited parts of the process's address space often will actually be performed in the cache 12 or in a cache on board microprocessor 11 rather than on the RAM 14, with which those caches swap data and instructions just as RAM 14 and system disk 17 do with each other.

A further level of abstraction results from the fact that an application will often be run as one of many processes operating concurrently with the support of an underlying operating system. As part of that system's memory management, the application's memory space may be moved among different actual physical locations many times in order to allow different processes to employ shared physical memory devices. That is, the location specified in the application's machine code may actually result in different physical locations at different times because the operating system adds different offsets to the machine-language-specified location.

Despite these expedients, the use of static memory allocation in writing certain long-lived applications makes it difficult to restrict storage requirements to the available memory space. Abiding by space limitations is easier when the platform provides for dynamic memory allocation, i.e., when memory space to be allocated to a given object is determined only at run time.

Dynamic allocation has a number of advantages, among which is that the run-time system is able to adapt allocation to run-time conditions. For example, the programmer can specify that space should be allocated for a given object only in response to a particular run-time condition. The C-language library function malloc( ) is often used for this purpose. Conversely, the programmer can specify conditions under which memory previously allocated to a given object can be reclaimed for reuse. The C-language library function free( ) results in such memory reclamation.

Because dynamic allocation provides for memory reuse, it facilitates generation of large or long-lived applications, which over the course of their lifetimes may employ objects whose total memory requirements would greatly exceed the available memory resources if they were bound to memory locations statically.

Particularly for long-lived applications, though, allocation and reclamation of dynamic memory must be performed carefully. If the application fails to reclaim unused memory—or, worse, loses track of the address of a dynamically allocated segment of memory—its memory requirements will grow over time to exceed the system's available memory. This kind of error is known as a "memory leak."

Another kind of error occurs when an application reclaims memory for reuse even though it still maintains a reference to that memory. If the reclaimed memory is reallocated for a different purpose, the application may inadvertently manipulate the same memory in multiple inconsistent ways. This kind of error is known as a "dangling reference," because an application should not retain a reference to a memory location once that location is reclaimed. Explicit dynamic-memory management by using interfaces like malloc( )/free( ) often leads to these problems.

A way of reducing the likelihood of such leaks and related errors is to provide memory-space reclamation in a more-automatic manner. Techniques used by systems that reclaim memory space automatically are commonly referred to as "garbage collection." Garbage collectors operate by reclaiming space that they no longer consider "reachable." Statically allocated objects represented by a program's global variables are normally considered reachable throughout a program's life. Such objects are not ordinarily stored in the garbage collector's managed memory space, but they may contain references to dynamically allocated objects that are, and such objects are considered reachable. Clearly, an object referred to in the processor's call stack is reachable, as is an object referred to by register contents. And an object referred to by any reachable object is also reachable.

The use of garbage collectors is advantageous because, whereas a programmer working on a particular sequence of code can perform his task creditably in most respects with only local knowledge of the application at any given time, memory allocation and reclamation require a global knowledge of the program. Specifically, a programmer dealing with a given sequence of code does tend to know whether some portion of memory is still in use for that sequence of code, but it is considerably more difficult for him to know what the rest of the application is doing with that memory. By tracing references from some conservative notion of a "root set," e.g., global variables, registers, and the call stack, automatic garbage collectors obtain global knowledge in a methodical way. By using a garbage collector, the programmer is relieved of the need to worry about the application's global state and can concentrate on local-state issues, which are more manageable. The result is applications that are more robust, having no dangling references and fewer memory leaks.

Garbage-collection mechanisms can be implemented by various parts and levels of a computing system. One approach is simply to provide them as part of a batch compiler's output. Consider FIG. 2's simple batch-compiler operation, for example. A computer system executes in accordance with compiler object code and therefore acts as a compiler 20. The compiler object code is typically stored on a medium such as FIG. 1's system disk 17 or some other machine-readable medium, and it is loaded into RAM 14 to configure the computer system to act as a compiler. In some cases, though, the compiler object code's persistent storage may instead be provided in a server system remote from the machine that performs the compiling. The electrical signals that carry the digital data by which the computer systems exchange that code are examples of the kinds of electromagnetic signals by which the computer instructions can be communicated. Others are radio waves, microwaves, and both visible and invisible light.

The input to the compiler is the application source code, and the end product of the compiler process is application object code. This object code defines an application 21, which typically operates on input such as mouse clicks, etc., to generate a display or some other type of output. This object code implements the relationship that the programmer intends to specify by his application source code. In one approach to garbage collection, the compiler 20, without the programmer's explicit direction, additionally generates code that automatically reclaims unreachable memory space.

Even in this simple case, though, there is a sense in which the application does not itself provide the entire garbage collector. Specifically, the application will typically call upon the underlying operating system's memory-allocation functions. And the operating system may in turn take advantage of various hardware that lends itself particularly to use in garbage collection. So even a very simple system may disperse the garbage-collection mechanism over a number of computer-system layers.

To get some sense of the variety of system components that can be used to implement garbage collection, consider FIG. 3's example of a more complex way in which various levels of source code can result in the machine instructions that a processor executes. In the FIG. 3 arrangement, the human applications programmer produces source code 22 written in a high-level language. A compiler 23 typically converts that code into "class files." These files include routines written in instructions, called "byte codes" 24, for a "virtual machine" that various processors can be software-configured to emulate. This conversion into byte codes is almost always separated in time from those codes' execution, so FIG. 3 divides the sequence into a "compile-time environment" 25 separate from a "run-time environment" 26, in which execution occurs. One example of a high-level language for which compilers are available to produce such virtual-machine instructions is the Java™ programming language. (Java is a trademark or registered trademark of Sun Microsystems, Inc., in the United States and other countries.)

Most typically, the class files' byte-code routines are executed by a processor under control of a virtual-machine process 27. That process emulates a virtual machine from whose instruction set the byte codes are drawn. As is true of the compiler 23, the virtual-machine process 27 may be specified by code stored on a local disk or some other machine-readable medium from which it is read into FIG. 1's RAM 14 to configure the computer system to implement the garbage collector and otherwise act as a virtual machine. Again, though, that code's persistent storage may instead be provided by a server system remote from the processor that implements the virtual machine, in which case the code would be transmitted electrically or optically to the virtual-machine-implementing processor.

In some implementations, much of the virtual machine's action in executing these byte codes is most like what those skilled in the art refer to as "interpreting," so FIG. 3 depicts the virtual machine as including an "interpreter" 28 for that purpose. In addition to or instead of running an interpreter, many virtual-machine implementations actually compile the byte codes concurrently with the resultant object code's execution, so FIG. 3 depicts the virtual machine as additionally including a "just-in-time" compiler 29. The arrangement of FIG. 3 differs from FIG. 2 in that the compiler 23 for converting the human programmer's code does not contribute to providing the garbage-collection function; that results largely from the virtual machine 27's operation.

Those skilled in that art will recognize that both of these organizations are merely exemplary, and many modem systems employ hybrid mechanisms, which partake of the characteristics of traditional compilers and traditional interpreters both. The invention to be described below is applicable independently of whether a batch compiler, a just-in-time compiler, an interpreter, or some hybrid is employed to process source code. In the remainder of this application, therefore, we will use the term compiler to refer to any such mechanism, even if it is what would more typically be called an interpreter.

The arrangement of FIG. 3 differs from FIG. 2 in that the compiler 23 for converting the human programmer's code does not contribute to providing the garbage-collection function; that results largely from the virtual machine 27's operation. Although the FIG. 3 arrangement is a popular one, it is by no means universal, and many further implementation types can be expected. Proposals have even been made to implement the virtual machine 27's behavior in a hardware processor, in which case the hardware itself would provide some or all of the garbage-collection function.

In short, garbage collectors can be implemented in a wide range of combinations of hardware and/or software. As is true of most of the garbage-collection techniques described in the literature, the invention to be described below is applicable to most such systems.

By implementing garbage collection, a computer system can greatly reduce the occurrence of memory leaks and other software deficiencies in which human programming frequently results. But it can also have significant adverse performance effects if it is not implemented carefully. To distinguish the part of the program that does "useful" work from that which does the garbage collection, the term mutator is sometimes used in discussions of these effects; from the collector's point of view, what the mutator does is mutate active data structures' connectivity.

Some garbage-collection approaches rely heavily on interleaving garbage-collection steps among mutator steps. In one type of garbage-collection approach, for instance, the mutator operation of writing a reference is followed immediately by garbage-collector steps used to maintain a reference count in that object's header, and code for subsequent new-object storage includes steps for finding space occupied by objects whose reference count has fallen to zero. Obviously, such an approach can slow mutator operation significantly.

Other approaches therefore interleave very few garbage-collector-related instructions into the main mutator process but instead interrupt it from time to time to perform garbage-collection cycles, in which the garbage collector finds unreachable objects and reclaims their memory space for reuse. Such an approach will be assumed in discussing FIG. 4's depiction of a simple garbage-collection operation. Within the memory space allocated to a given application is a part 40 managed by automatic garbage collection. In the following discussion, this will be referred to as the "heap," although in other contexts that term refers to all dynamically allocated memory. During the course of the application's execution, space is allocated for various objects 42, 44, 46, 48, and 50. Typically, the mutator allocates space within the heap by invoking the garbage collector, which at some level manages access to the heap. Basically, the mutator asks the garbage collector for a pointer to a heap region where it can safely place the object's data. The garbage collector keeps track of the fact that the thus-allocated region is occupied. It will refrain from allocating that region in response to any other request until it determines that the mutator no longer needs the region allocated to that object.

Garbage collectors vary as to which objects they consider reachable and unreachable. For the present discussion, though, an object will be considered "reachable" if it is referred to, as object 42 is, by a reference in the root set 52. The root set consists of reference values stored in the mutator's threads' call stacks, the CPU registers, and global variables outside the garbage-collected heap. An object is also reachable if it is referred to, as object 46 is, by another reachable object (in this case, object 42). Objects that are not reachable can no longer affect the program, so it is safe to re-allocate the memory spaces that they occupy.

A typical approach to garbage collection is therefore to identify all reachable objects and reclaim any previously allocated memory that the reachable objects do not occupy. A typical garbage collector may identify reachable objects by tracing references from the root set 52. For the sake of simplicity, FIG. 4 depicts only one reference from the root set 52 into the heap 40. (Those skilled in the art will recognize that there are many ways to identify references, or at least data contents that may be references.) The collector notes that the root set points to object 42, which is therefore reachable, and that reachable object 42 points to object 46, which therefore is also reachable. But those reachable objects point to no other objects, so objects 44, 48, and 50 are all unreachable, and their memory space may be reclaimed. This may involve, say, placing that memory space in a list of free memory blocks.

To avoid excessive heap fragmentation, some garbage collectors additionally relocate reachable objects. FIG. 5 shows a typical approach. The heap is partitioned into two halves, hereafter called "semi-spaces." For one garbage-collection cycle, all objects are allocated in one semi-space 54, leaving the other semi-space 56 free. When the garbage-collection cycle occurs, objects identified as reachable are "evacuated" to the other semi-space 56, so all of semi-space 54 is then considered free. Once the garbage-collection cycle has occurred, all new objects are allocated in the lower semi-space 56 until yet another garbage-collection cycle occurs, at which time the reachable objects are evacuated back to the upper semi-space 54.

Although this relocation requires the extra steps of copying the reachable objects and updating references to them, it tends to be quite efficient, since most new objects quickly become unreachable, so most of the current semi-space is actually garbage. That is, only a relatively few, reachable objects need to be relocated, after which the entire semi-space contains only garbage and can be pronounced free for reallocation.

Now, a collection cycle can involve following all reference chains from the basic root set—i.e., from inherently reachable locations such as the call stacks, class statics and other global variables, and registers—and reclaiming all space occupied by objects not encountered in the process. And the simplest way of performing such a cycle is to interrupt the mutator to provide a collector interval in which the entire cycle is performed before the mutator resumes. For certain types of applications, this approach to collection-cycle scheduling is acceptable and, in fact, highly efficient.

For many interactive and real-time applications, though, this approach is not acceptable. The delay in mutator operation that the collection cycle's execution causes can be annoying to a user and can prevent a real-time application from responding to its environment with the required speed. In some applications, choosing collection times opportunistically can reduce this effect. Collection intervals can be inserted when an interactive mutator reaches a point at which it awaits user input, for instance.

So it may often be true that the garbage-collection operation's effect on performance can depend less on the total collection time than on when collections actually occur. But another factor that often is even more determinative is the duration of any single collection interval, i.e., how long the mutator must remain quiescent at any one time. In an interactive system, for instance, a user may never notice hundred-millisecond interruptions for garbage collection, whereas most users would find interruptions lasting for two seconds to be annoying.

The cycle may therefore be divided up among a plurality of collector intervals. When a collection cycle is divided up among a plurality of collection intervals, it is only after a number of intervals that the collector will have followed all reference chains and be able to identify as garbage any objects not thereby reached. This approach is more complex than completing the cycle in a single collection interval; the mutator will usually modify references between collection intervals, so the collector must repeatedly update its view of the reference graph in the midst of the collection cycle. To make such updates practical, the mutator must communicate with the collector to let it know what reference changes are made between intervals.

An even more complex approach, which some systems use to eliminate discrete pauses or maximize resource-use efficiency, is to execute the mutator and collector in concurrent execution threads. Most systems that use this approach use it for most but not all of the collection cycle; the mutator is usually interrupted for a short collector interval, in which a part of the collector cycle takes place without mutation.

Independent of whether the collection cycle is performed concurrently with mutator operation, is completed in a single interval, or extends over multiple intervals is the question of whether the cycle is complete, as has tacitly been assumed so far, or is instead "incremental." In incremental collection, a collection cycle constitutes only an increment of collection: the collector does not follow all reference chains from the basic root set completely. Instead, it concentrates on only a portion, or collection set, of the heap. Specifically, it identifies every collection-set object referred to by a reference chain that extends into the collection set from outside of it, and it reclaims the collection-set space not occupied by such objects, possibly after evacuating them from the collection set.

By thus culling objects referenced by reference chains that do not necessarily originate in the basic root set, the collector can be thought of as expanding the root set to include as roots some locations that may not be reachable. Although incremental collection thereby leaves "floating garbage," it can result in relatively low pause times even if entire collection increments are completed during respective single collection intervals.

Most collectors that employ incremental collection operate in "generations," although this is not necessary in principle. Different portions, or generations, of the heap are subject to different collection policies. New objects are allocated in a "young" generation, and older objects are promoted from younger generations to older or more "mature" generations. Collecting the younger generations more frequently than the others yields greater efficiency because the younger generations tend to accumulate garbage faster; newly allocated objects tend to "die," while older objects tend to "survive."

But generational collection greatly increases what is effectively the root set for a given generation. Consider FIG. 6, which depicts a heap as organized into three generations 58, 60, and 62. Assume that generation 60 is to be collected. The process for this individual generation may be more or less the same as that described in connection with FIGS. 4 and 5 for the entire heap, with one major exception. In the case of a single generation, the root set must be considered to include not only the call stack, registers, and global variables represented by set 52 but also objects in the other generations 58 and 62, which themselves may contain references to objects in generation 60. So pointers must be traced not only from the basic root set 52 but also from objects within the other generations.

One could perform this tracing by simply inspecting all references in all other generations at the beginning of every collection interval, and it turns out that this approach is actually feasible in some situations. But it takes too long in other situations, so workers in this field have employed a number of approaches to expediting reference tracing. One approach is to include so-called write barriers in the mutator process. A write barrier is code added to a write operation to record information from which the collector can determine where references were written or may have been since the last collection interval. A reference list can then be maintained by taking such a list as it existed at the end of the previous collection interval and updating it by inspecting only locations identified by the write barrier as possibly modified since the last collection interval.

One of the many write-barrier implementations commonly used by workers in this art employs what has been referred to as the "card table." FIG. 6 depicts the various generations as being divided into smaller sections, known for this purpose as "cards." Card tables 64, 66, and 68 associated with respective generations contain an entry for each of their cards. When the mutator writes a reference in a card, it makes an appropriate entry in the card-table location associated with that card (or, say, with the card in which the object containing the reference begins). Most write-barrier implementations simply make a Boolean entry indicating that the write operation has been performed, although some may be more elaborate. The mutator having thus left a record of where new or modified references may be, the collector can thereafter prepare appropriate summaries of that information, as will be explained in due course. For the sake of concreteness, we will assume that the summaries are maintained by steps that occur principally at the beginning of each collection interval.

Of course, there are other write-barrier approaches, such as simply having the write barrier add to a list of addresses where references where written. Also, although there is no reason in principle to favor any particular number of generations, and although FIG. 6 shows three, most generational garbage collectors have only two generations, of which one is the young generation and the other is the mature generation. Moreover, although FIG. 6 shows the generations as being of the same size, a more-typical configuration is for the young generation to be considerably smaller. Finally, although we assumed for the sake of simplicity that collection during a given interval was limited to only one generation, a more-typical approach is actually to collect the whole young generation at every interval but to collect the mature one less frequently.

Some collectors collect the entire young generation in every interval and may thereafter perform mature-generation collection in the same interval. It may therefore take relatively little time to scan all young-generation objects remaining after young-generation collection to find references into the mature generation. Even when such collectors do use card tables, therefore, they often do not use them for finding young-generation references that refer to mature-generation objects. On the other hand, laboriously scanning the entire mature generation for references to young-generation (or mature-generation) objects would ordinarily take too long, so the collector uses the card table to limit the amount of memory it searches for mature-generation references.

Now, although it typically takes very little time to collect the young generation, it may take more time than is acceptable within a single garbage-collection cycle to collect the entire mature generation. So some garbage collectors may collect the mature generation incrementally; that is, they may perform only a part of the mature generation's collection during any particular collection cycle. Incremental collection presents the problem that, since the generation's unreachable objects outside the "collection set" of objects processed during that cycle cannot be recognized as unreachable, collection-set objects to which they refer tend not to be, either.

To reduce the adverse effect this would otherwise have on collection efficiency, workers in this field have employed the "train algorithm," which FIG. 7 depicts. A generation to be collected incrementally is divided into sections, which for reasons about to be described are referred to as "car sections." Conventionally, a generation's incremental collection occurs in fixed-size sections, and a car section's size is that of the generation portion to be collected during one cycle.

The discussion that follows will occasionally employ the nomenclature in the literature by using the term car instead of car section. But the literature seems to use that term to refer variously not only to memory sections themselves but also to data structures that the train algorithm employs to manage them when they contain objects, as well as to the more-abstract concept that the car section and managing data structure represent in discussions of the algorithm. So the following discussion will more frequently use the expression car section to emphasize the actual sections of memory space for whose management the car concept is employed.

According to the train algorithm, the car sections are grouped into "trains," which are ordered, conventionally according to age. For example, FIG. 7 shows an oldest train 73 consisting of a generation 74's three car sections described by associated data structures 75, 76, and 78, while a second train 80 consists only of a single car section, represented by structure 82, and the youngest train 84 (referred to as the "allocation train") consists of car sections that data structures 86 and 88 represent. As will be seen below, car sections' train memberships can change, and any car section added to a train is typically added to the end of a train.

Conventionally, the car collected in an increment is the one added earliest to the oldest train, which in this case is car 75. All of the generation's cars can thus be thought of as waiting for collection in a single long line, in which cars are ordered in accordance with the order of the trains to which they belong and, within trains, in accordance with the order in which they were added to those trains.

As is usual, the way in which reachable objects are identified is to determine whether there are references to them in the root set or in any other object already determined to be reachable. In accordance with the train algorithm, the collector additionally performs a test to determine whether there are any references at all from outside the oldest train to objects within it. If there are not, then all cars within the train can be reclaimed, even though not all of those cars are in the collection set. And the train algorithm so operates that inter-car references tend to be grouped into trains, as will now be explained.

To identify references into the car from outside of it, train-algorithm implementations typically employ "remembered sets." As card tables are, remembered sets are used to keep track of references. Whereas a card-table entry contains information about references that the associated card contains, though, a remembered set associated with a given region contains information about references into that region from locations outside of it. In the case of the train algorithm, remembered sets are associated with car sections. Each remembered set, such as car 75's remembered set 90, lists locations in the generation that contain references into the associated car section.

The remembered sets for all of a generation's cars are typically updated at the start of each collection cycle. To illustrate how such updating and other collection operations may be carried out, FIGS. 8A and 8B (together, "FIG. 8") depict an operational sequence in a system of the typical type mention above. That is, it shows a sequence of operations that may occur in a system in which the entire garbage-collected heap is divided into two generations, namely, a young generation and an old generation, and in which the young generation is much smaller than the old generation. FIG. 8 is also based on the assumption and that the train algorithm is used only for collecting the old generation.

Block 102 represents a period of the mutator's operation. As was explained above, the mutator makes a card-table entry to identify any card that it has "dirtied" by adding or modifying a reference that the card contains. At some point, the mutator will be interrupted for collector operation. Different implementations employ different events to trigger such an interruption, but we will assume for the sake of concreteness that the system's dynamic-allocation routine causes such interruptions when no room is left in the young generation for any further allocation. A dashed line 103 represents the transition from mutator operation and collector operation.

In the system assumed for the FIG. 8 example, the collector collects the (entire) young generation each time such an interruption occurs. When the young generation's collection ends, the mutator operation usually resumes, without the collector's having collected any part of the old generation. Once in a while, though, the collector also collects part of the old generation, and FIG. 8 is intended to illustrate such an occasion.

When the collector's interval first starts, it first processes the card table, in an operation that block 104 represents. As was mentioned above, the collector scans the "dirtied" cards for references into the young generation. If a reference is found, that fact is memorialized appropriately. If the reference refers to a young-generation object, for example, an expanded card table may be used for this purpose. For each card, such an expanded card table might include a multi-byte array used to summarize the card's reference contents. The summary may, for instance, be a list of offsets that indicate the exact locations within the card of references to young-generation objects, or it may be a list of fine-granularity "sub-cards" within which references to young-generation objects may be found. If the reference refers to an old-generation object, the collector often adds an entry to the remembered set associated with the car containing that old-generation object. The entry identifies the reference's location, or at least a small region in which the reference can be found. For reasons that will become apparent, though, the collector will typically not bother to place in the remembered set the locations of references from objects in car sections farther forward in the collection queue than the referred-to object, i.e., from objects in older trains or in cars added earlier to the same train.

The collector then collects the young generation, as block 105 indicates. (Actually, young-generation collection may be interleaved with the dirty-region scanning, but the drawing illustrates it for purpose of explanation as being separate.) If a young-generation object is referred to by a reference that card-table scanning has revealed, that object is considered to be potentially reachable, as is any young-generation object referred to by a reference in the root set or in another reachable young-generation object. The space occupied by any young-generation object thus considered reachable is with-held from reclamation. For example, it may be evacuated to a young-generation semi-space that will be used for allocation during the next mutator interval. It may instead be promoted into the older generation, where it is placed into a car containing a reference to it or into a car in the last train. Or some other technique may be used to keep the memory space it occupies off the system's free list. The collector then reclaims any young-generation space occupied by any other objects, i.e., by any young-generation objects not identified as transitively reachable through references located outside the young generation.

The collector then performs the train algorithm's central test, referred to above, of determining whether there are any references into the oldest train from outside of it. As was mentioned above, the actual process of determining, for each object, whether it can be identified as unreachable is performed for only a single car section in any cycle. In the absence of features such as those provided by the train algorithm, this would present a problem, because garbage structures may be larger than a car section. Objects in such structures would therefore (erroneously) appear reachable, since they are referred to from outside the car section under consideration. But the train algorithm additionally keeps track of whether there are any references into a given car from outside the train to which it belongs, and trains' sizes are not limited. As will be apparent presently, objects not found to be unreachable are relocated in such a way that garbage structures tend to be gathered into respective trains into which, eventually, no references from outside the train point. If no references from outside the train point to any objects inside the train, the train can be recognized as containing only garbage. This is the test that block 106 represents. All cars in a train thus identified as containing only garbage can be reclaimed.

The question of whether old-generation references point into the train from outside of it is (conservatively) answered in the course of updating remembered sets; in the course of updating a car's remembered set, it is a simple matter to flag the car as being referred to from outside the train. The step-106 test additionally involves determining whether any references from outside the old generation point into the oldest train. Various approaches to making this determination have been suggested, including the conceptually simple approach of merely following all reference chains from the root set until those chains (1) terminate, (2) reach an old-generation object outside the oldest train, or (3) reach an object in the oldest train. In the two-generation example, most of this work can be done readily by identifying references into the collection set from live young-generation objects during the young-generation collection. If one or more such chains reach the oldest train, that train includes reachable objects. It may also include reachable objects if the remembered-set-update operation has found one or more references into the oldest train from outside of it. Otherwise, that train contains only garbage, and the collector reclaims all of its car sections for reuse, as block 107 indicates. The collector may then return control to the mutator, which resumes execution, as FIG. 8B's block 108 indicates.

If the train contains reachable objects, on the other hand, the collector turns to evacuating potentially reachable objects from the collection set. The first operation, which block 110 represents, is to remove from the collection set any object that is reachable from the root set by way of a reference chain that does not pass through the part of the old generation that is outside of the collection set. In the illustrated arrangement, in which there are only two generations, and the young generation has previously been completely collected during the same interval, this means evacuating from a collection set any object that (1) is directly referred to by a reference in the root set, (2) is directly referred to by a reference in the young generation (in which no remaining objects have been found unreachable), or (3) is referred to by any reference in an object thereby evacuated. All of the objects thus evacuated are placed in cars in the youngest train, which was newly created during the collection cycle. Certain of the mechanics involved in the evacuation process are described in more detail in connection with similar evacuation performed, as blocks 112 and 114 indicate, in response to remembered-set entries.

FIG. 9 illustrates how the processing represented by block 114 proceeds. The entries identify heap regions, and, as block 116 indicates, the collector scans the thus-identified heap regions to find references to locations in the collection-set. As blocks 118 and 120 indicate, that entry's processing continues until the collector finds no more such references. Every time the collector does find such a reference, it checks to determine whether, as a result of a previous entry's processing, the referred-to object has already been evacuated. If it has not, the collector evacuates the referred-to object to a (possibly new) car in the train containing the reference, as blocks 122 and 124 indicate.

As FIG. 10 indicates, the evacuation operation includes more than just object relocation, which block 126 represents. Once the object has been moved, the collector places a forwarding pointer in the collection-set location from which it was evacuated, for a purpose that will become apparent presently. Block 128 represents that step. (Actually, there are some cases in which the evacuation is only a "logical" evacuation: the car containing the object is simply re-linked to a different logical place in the collection sequence, but its address does not change. In such cases, forwarding pointers are unnecessary.) Additionally, the reference in response to which the object was evacuated is up-dated to point to the evacuated object's new location, as block 130 indicates. And, as block 132 indicates, any reference contained in the evacuated object is processed, in an operation that FIGS. 11A and 11B (together, "FIG. 11") depict.

For each one of the evacuated object's references, the collector checks to see whether the location that it refers to is in the collection set. As blocks 134 and 136 indicate, the reference processing continues until all references in the evacuated object have been processed. In the meantime, if a reference refers to a collection-set location that contains an object not yet evacuated, the collector evacuates the referred-to object to the train to which the evacuated object containing the reference was evacuated, as blocks 138 and 140 indicate.

If the reference refers to a location in the collection set from which the object has already been evacuated, then the collector uses the forwarding pointer left in that location to update the reference, as block 142 indicates. Before the processing of FIG. 11, the remembered set of the referred-to object's car will have an entry that identifies the evacuated object's old location as one containing a reference to the referred-to object. But the evacuation has placed the reference in a new location, for which the remembered set of the referred-to object's car may not have an entry. So, if that new location is not as far forward as the referred-to object, the collector adds to that remembered set an entry identifying the reference's new region, as blocks 144 and 146 indicate. As the drawings show, the same type of remembered-set update is performed if the object referred to by the evacuated reference is not in the collection set.

Now, some train-algorithm implementations postpone processing of the references contained in evacuated collection-set objects until after all directly reachable collection-set objects have been evacuated. In the implementation that FIG. 10 illustrates, though, the processing of a given evacuated object's references occurs before the next object is evacuated. So FIG. 11's blocks 134 and 148 indicate that the FIG. 11 operation is completed when all of the references contained in the evacuated object have been processed. This completes FIG. 10's object-evacuation operation, which FIG. 9's block 124 represents.

As FIG. 9 indicates, each collection-set object referred to by a reference in a remembered-set-entry-identified location is thus evacuated if it has not been already. If the object has already been evacuated from the referred-to location, the reference to that location is updated to point to the location to which the object has been evacuated. If the remembered set associated with the car containing the evacuated object's new location does not include an entry for the reference's location, it is updated to do so if the car containing the reference is younger than the car containing the evacuated object. Block 150 represents updating the reference and, if necessary, the remembered set.

As FIG. 8's blocks 112 and 114 indicate, this processing of collection-set remembered sets is performed initially only for entries that do not refer to locations in the oldest train. Those that do are processed only after all others have been, as blocks 152 and 154 indicate.

When this process has been completed, the collection set's memory space can be reclaimed, as block 164 indicates, since no remaining object is referred to from outside the collection set: any remaining collection-set object is unreachable. The collector then relinquishes control to the mutator.

FIGS. 12A–12J illustrate results of using the train algorithm. FIG. 12A represents a generation in which objects have been allocated in nine car sections. The oldest train has four cars, numbered 1.1 through 1.4. Car 1.1 has two objects, A and B. There is a reference to object B in the root set (which, as was explained above, includes live objects in the other generations). Object A is referred to by object L, which is in the third train's sole car section. In the generation's remembered sets 170, a reference in object L has therefore been recorded against car 1.1.

Processing always starts with the oldest train's earliest-added car, so the garbage collector refers to car 1.1's remembered set and finds that there is a reference from object L into the car being processed. It accordingly evacuates object A to the train that object L occupies. The object being evacuated is often placed in one of the selected train's existing cars, but we will assume for present purposes that there is not enough room. So the garbage collector evacuates object A into a new car section and updates appropriate data structures to identify it as the next car in the third train. FIG. 12B depicts the result: a new car has been added to the third train, and object A is placed in it.

FIG. 12B also shows that object B has been evacuated to a new car outside the first train. This is because object B has an external reference, which, like the reference to object A, is a reference from outside the first train, and one goal of the processing is to form trains into which there are no further references. Note that, to maintain a reference to the same object, object L's reference to object A has had to be rewritten, and so have object B's reference to object A and the inter-generational pointer to object B. In the illustrated example, the garbage collector begins a new train for the car into which object B is evacuated, but this is not a necessary requirement of the train algorithm. That algorithm requires only that externally referenced objects be evacuated to a newer train.

Since car 1.1 no longer contains live objects, it can be reclaimed, as FIG. 12B also indicates. Also note that the remembered set for car 2.1 now includes the address of a reference in object A, whereas it did not before. As was stated before, remembered sets in the illustrated embodiment include only references from cars further back in the order than the one with which the remembered set is associated. The reason for this is that any other cars will already be reclaimed by the time the car associated with that remembered set is processed, so there is no reason to keep track of references from them.

The next step is to process the next car, the one whose index is 1.2. Conventionally, this would not occur until some collection cycle after the one during which car 1.1 is collected. For the sake of simplicity we will assume that the mutator has not changed any references into the generation in the interim.

FIG. 12B depicts car 1.2 as containing only a single object, object C, and that car's remembered set contains the address of an inter-car reference from object F. The garbage collector follows that reference to object C. Since this identifies object C as possibly reachable, the garbage collector evacuates it from car set 1.2, which is to be reclaimed. Specifically, the garbage collector removes object C to a new car section, section 1.5, which is linked to the train to which the referring object F's car belongs. Of course, object F's reference needs to be updated to object C's new location. FIG. 12C depicts the evacuation's result.

FIG. 12C also indicates that car set 1.2 has been reclaimed, and car 1.3 is next to be processed. The only address in car 1.3's remembered set is that of a reference in object G. Inspection of that reference reveals that it refers to object F. Object F may therefore be reachable, so it must be evacuated before car section 1.3 is reclaimed. On the other hand, there are no references to objects D and E, so they are clearly garbage. FIG. 12D depicts the result of reclaiming car 1.3's space after evacuating possibly reachable object F.

In the state that FIG. 12D depicts, car 1.4 is next to be processed, and its remembered set contains the addresses of references in objects K and C. Inspection of object K's reference reveals that it refers to object H, so object H must be evacuated. Inspection of the other remembered-set entry, the reference in object C, reveals that it refers to object G, so that object is evacuated, too. As FIG. 12E illustrates, object H must be added to the second train, to which its referring object K belongs. In this case there is room enough in car 2.2, which its referring object K occupies, so evacuation of object H does not require that object K's reference to object H be added to car 2.2's remembered set. Object G is evacuated to a new car in the same train, since that train is where referring object C resides. And the address of the reference in object G to object C is added to car 1.5's remembered set.

FIG. 12E shows that this processing has eliminated all references into the first train, and it is an important part of the train algorithm to test for this condition. That is, even though there are references into both of the train's cars, those cars' contents can be recognized as all garbage because there are no references into the train from outside of it. So all of the first train's cars are reclaimed.

The collector accordingly processes car 2.1 during the next collection cycle, and that car's remembered set indicates that there are two references outside the car that refer to objects within it. Those references are in object K, which is in the same train, and object A, which is not. Inspection of those references reveals that they refer to objects I and J, which are evacuated.

The result, depicted in FIG. 12F, is that the remembered sets for the cars in the second train reveal no inter-car references, and there are no inter-generational references into it, either. That train's car sections therefore contain only garbage, and their memory space can be reclaimed.

So car 3.1 is processed next. Its sole object, object L, is referred to inter-generationally as well as by a reference in the fourth train's object M. As FIG. 12G shows, object L is therefore evacuated to the fourth train. And the address of the reference in object L to object A is placed in the remembered set associated with car 3.2, in which object A resides.

The next car to be processed is car 3.2, whose remembered set includes the addresses of references into it from objects B and L. Inspection of the reference from object B reveals that it refers to object A, which must therefore be evacuated to the fifth train before car 3.2 can be reclaimed.

Also, we assume that object A cannot fit in car section 5.1, so a new car 5.2 is added to that train, as FIG. 12H shows, and object A is placed in its car section. All referred-to objects in the third train having been evacuated, that (single-car) train can be reclaimed in its entirety.

A further observation needs to be made before we leave FIG. 12G. Car 3.2's remembered set additionally lists a reference in object L, so the garbage collector inspects that reference and finds that it points to the location previously occupied by object A. This brings up a feature of copying-collection techniques such as the typical train-algorithm implementation. When the garbage collector evacuates an object from a car section, it marks the location as having been evacuated and leaves the address of the object's new location. So, when the garbage collector traces the reference from object L, it finds that object A has been removed, and it accordingly copies the new location into object L as the new value of its reference to object A.

In the state that FIG. 12H illustrates, car 4.1 is the next to be processed. Inspection of the fourth train's remembered sets reveals no inter-train references into it, but the inter-generational scan (possibly performed with the aid of FIG. 6's card tables) reveals inter-generational references into car 4.2. So the fourth train cannot be reclaimed yet. The garbage collector accordingly evacuates car 4.1's referred-to objects in the normal manner, with the result that FIG. 12I depicts.

In that state, the next car to be processed has only inter-generational references into it. So, although its referred-to objects must therefore be evacuated from the train, they cannot be placed into trains that contain references to them. Conventionally, such objects are evacuated to a train at the end of the train sequence. In the illustrated implementation, a new train is formed for this purpose, so the result of car 4.2's processing is the state that FIG. 12J depicts.

Processing continues in this same fashion. Of course, subsequent collection cycles will not in general proceed, as in the illustrated cycles, without any reference changes by the mutator and without any addition of further objects. But reflection reveals that the general approach just described still applies when such mutations occur.

Thus dividing the collection operation into collection increments facilitates limiting the degree to which automatic collection interferes with mutator operation. But the collection operation still imposes a significant overhead on mutator operation, and a significant portion of this overhead is due to the repeated object evacuation that incremental collection in this fashion requires. Now, the amount of time taken by the evacuation process can be reduced by a judicious selection of the order in which objects are evacuated. But imposing this order necessitates the use of lists of references that have been found by scanning the locations that the collection-set entries identify, and this can impose an essentially unbounded memory cost on the evacuation operation.

SUMMARY OF THE INVENTION

According to the present invention, this memory cost is bounded by encoding the reference-list entries judiciously. Specifically, each reference-list entry includes a location identifier and a mode indicator. The location identifier identifies a location in the generation where a reference into the collection set has been found. The mode indicator indicates whether the location identifier specifies only an individual-reference location or instead a region large enough to contain multiple references. With such an encoding, the amount of memory required for a reference list does not need to grow as fast as the number of references, so the evacuation-order advantages that creating a reference list affords are not compromised unduly by those lists' memory-space cost.

BRIEF DESCRIPTION OF THE DRAWINGS

The invention description below refers to the accompanying drawings, of which:

FIGS. 12A–12J, discussed above, are diagrams that illustrate a collection scenario that can result from using the train algorithm;

DETAILED DESCRIPTION OF AN ILLUSTRATIVE EMBODIMENT

Figure 1:
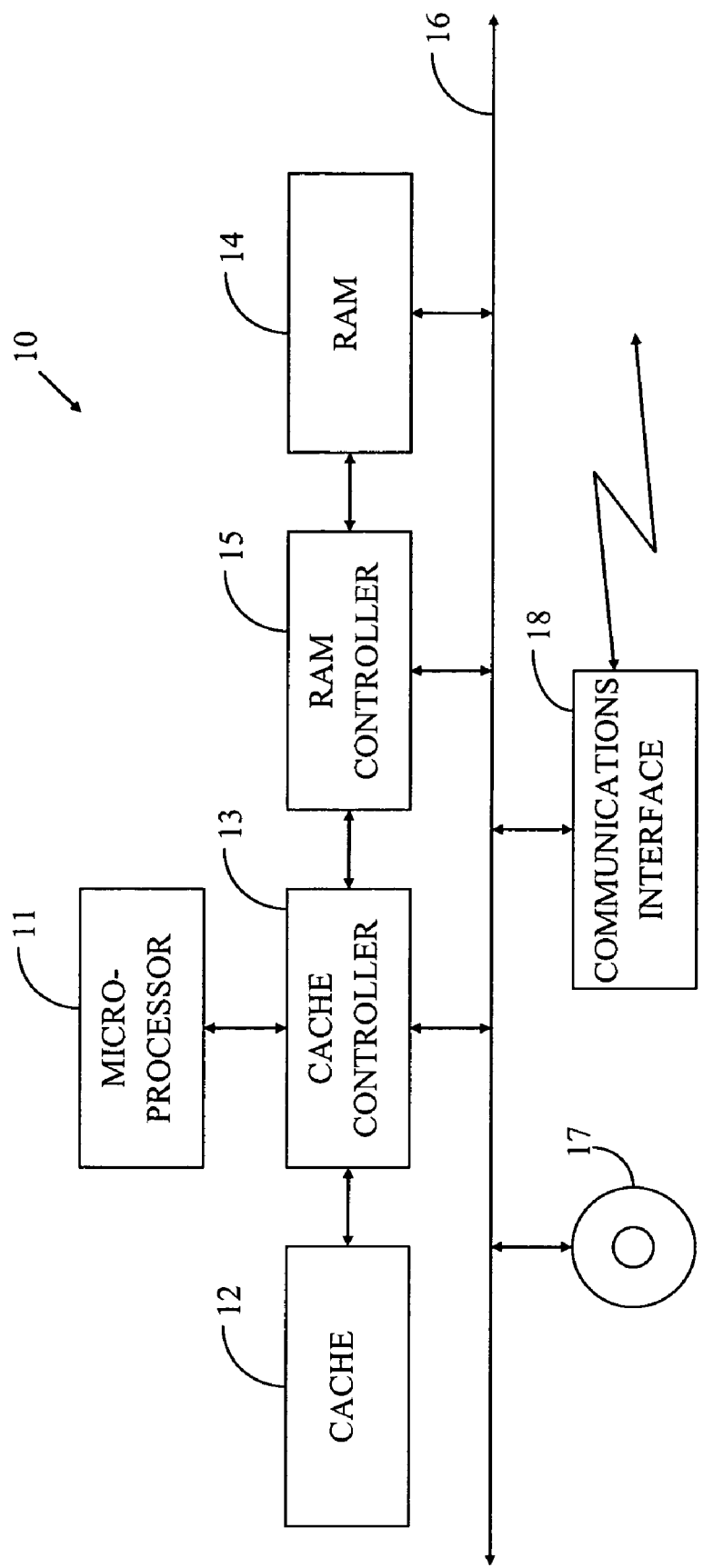
FIG. 1, discussed above, is a block diagram of a computer system in which the present invention's teachings can be practiced.
Figure 2:
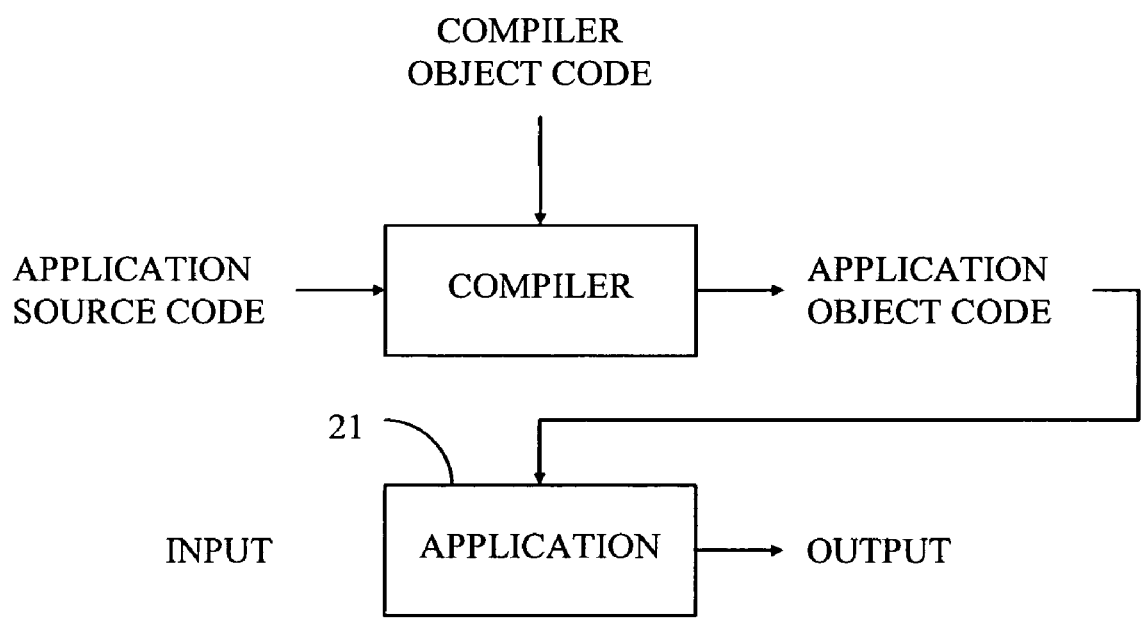
FIG. 2 as, discussed above, is a block diagram that illustrates a compiler's basic functions.
Figure 3:
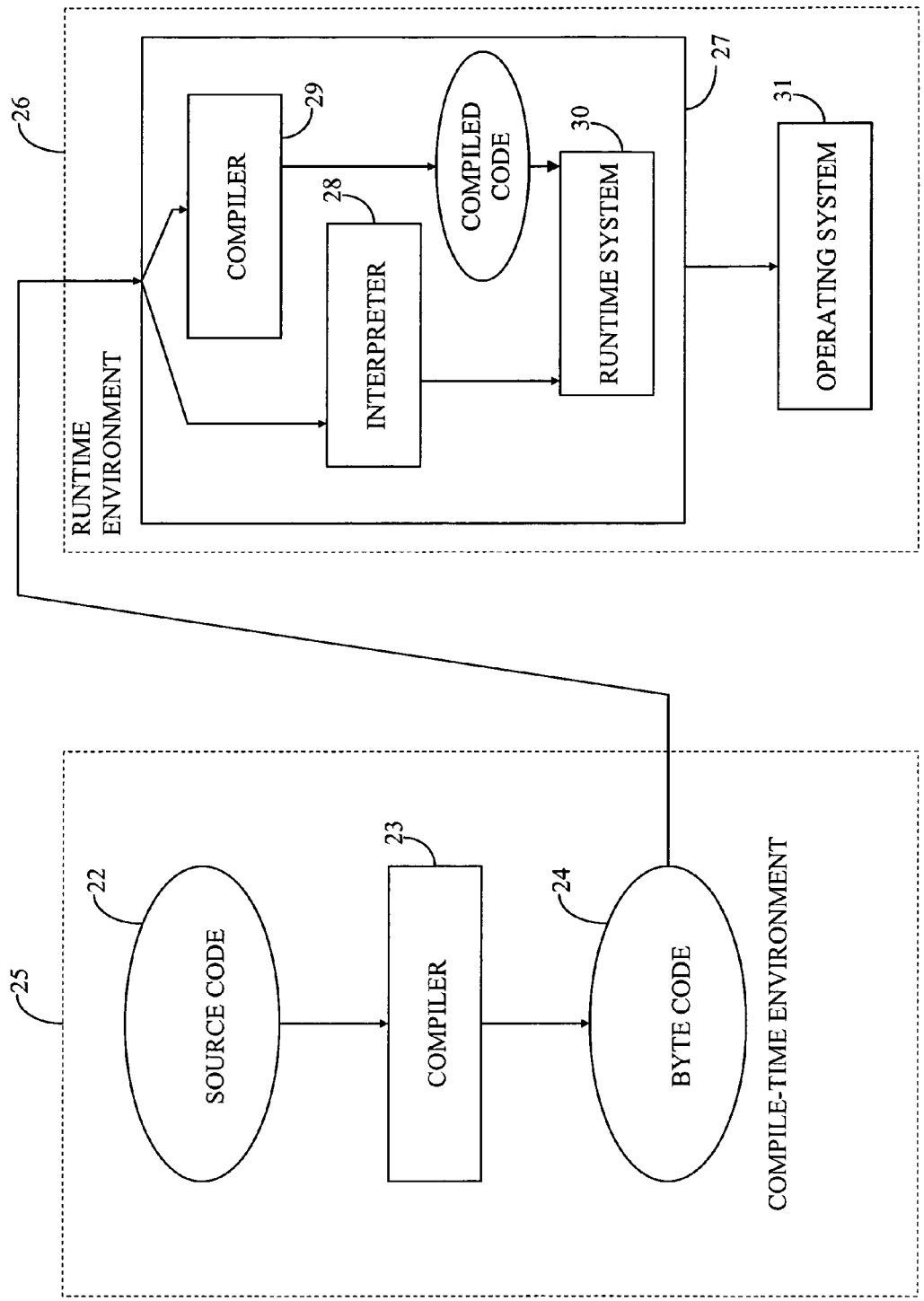
FIG. 3, discussed above, is a block diagram that illustrates a more-complicated compiler/interpreter organization.
Figure 4:
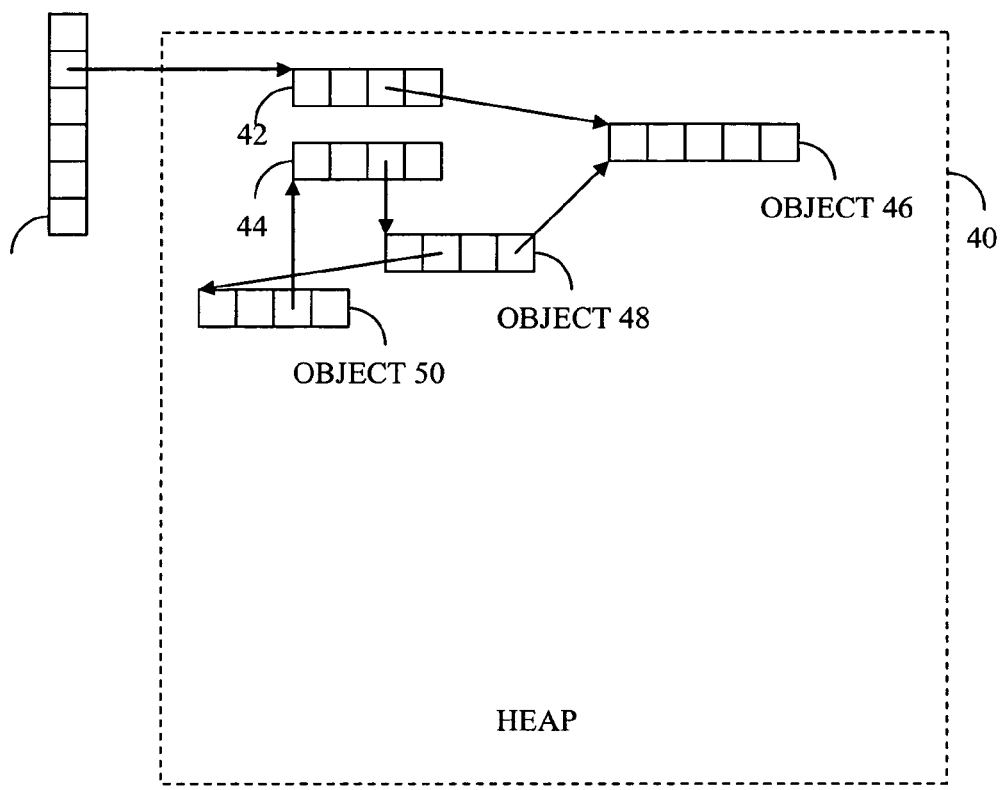
FIG. 4, discussed above, is a diagram that illustrates a basic garbage-collection mechanism.
Figure 5:
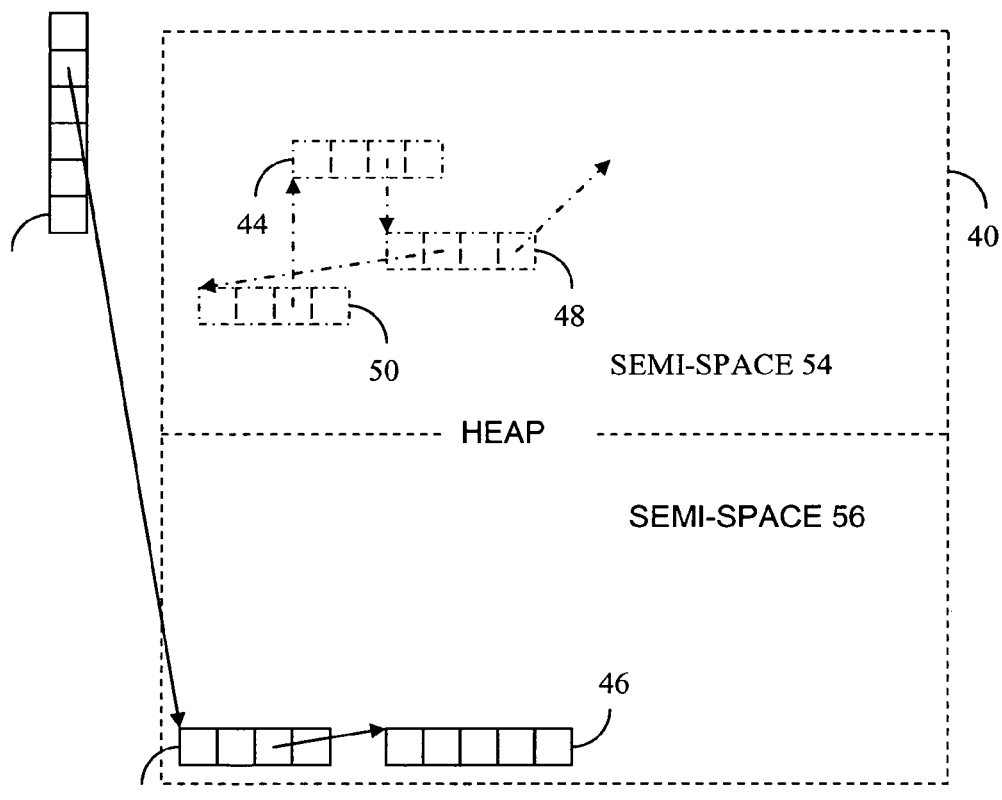
FIG. 5, discussed above, is a similar diagram illustrating that garbage-collection approach's relocation operation.
Figure 6:
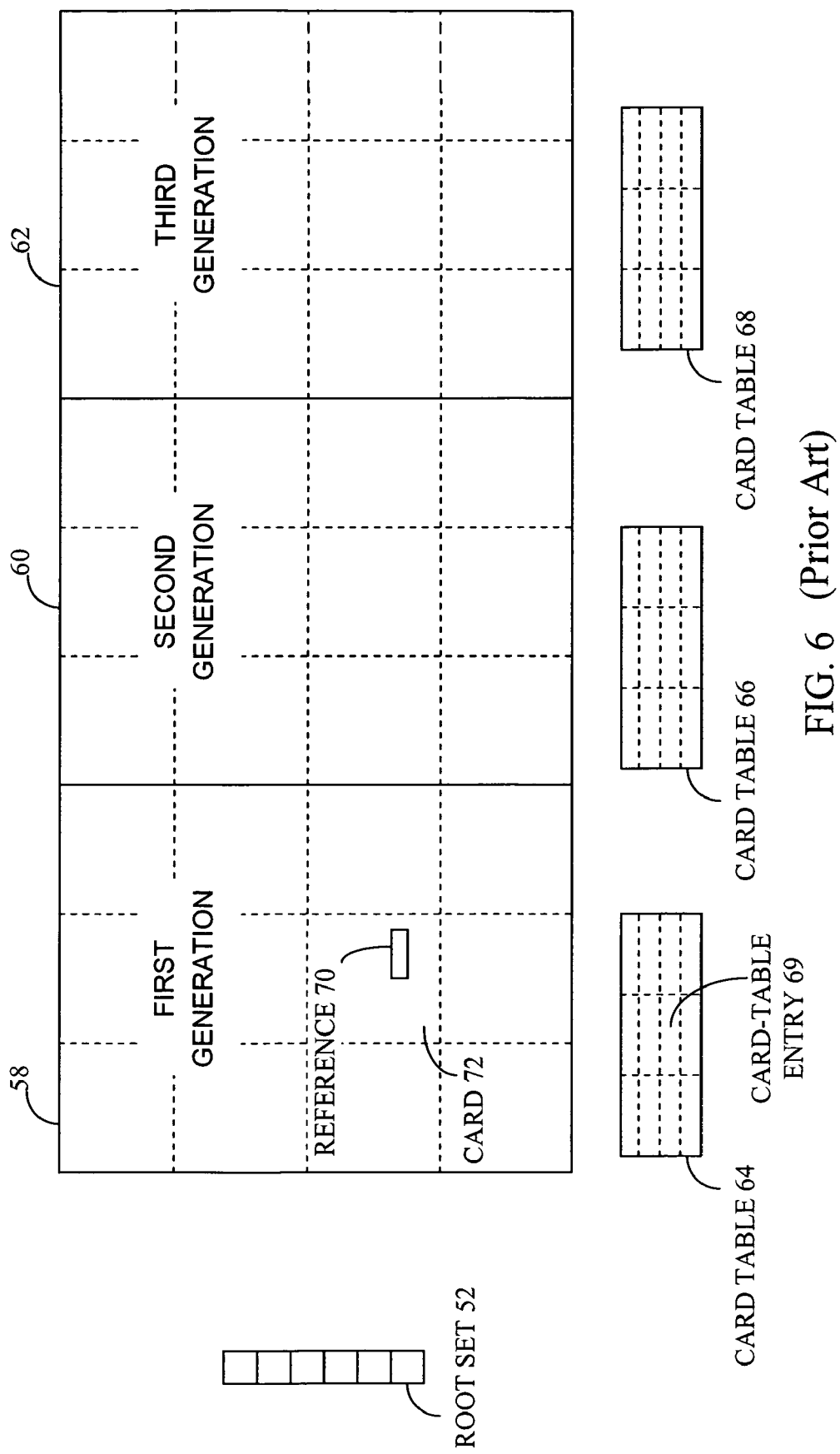
FIG. 6, discussed above, is a diagram that illustrates a garbage-collected heap's organization into generations.
Figure 7:
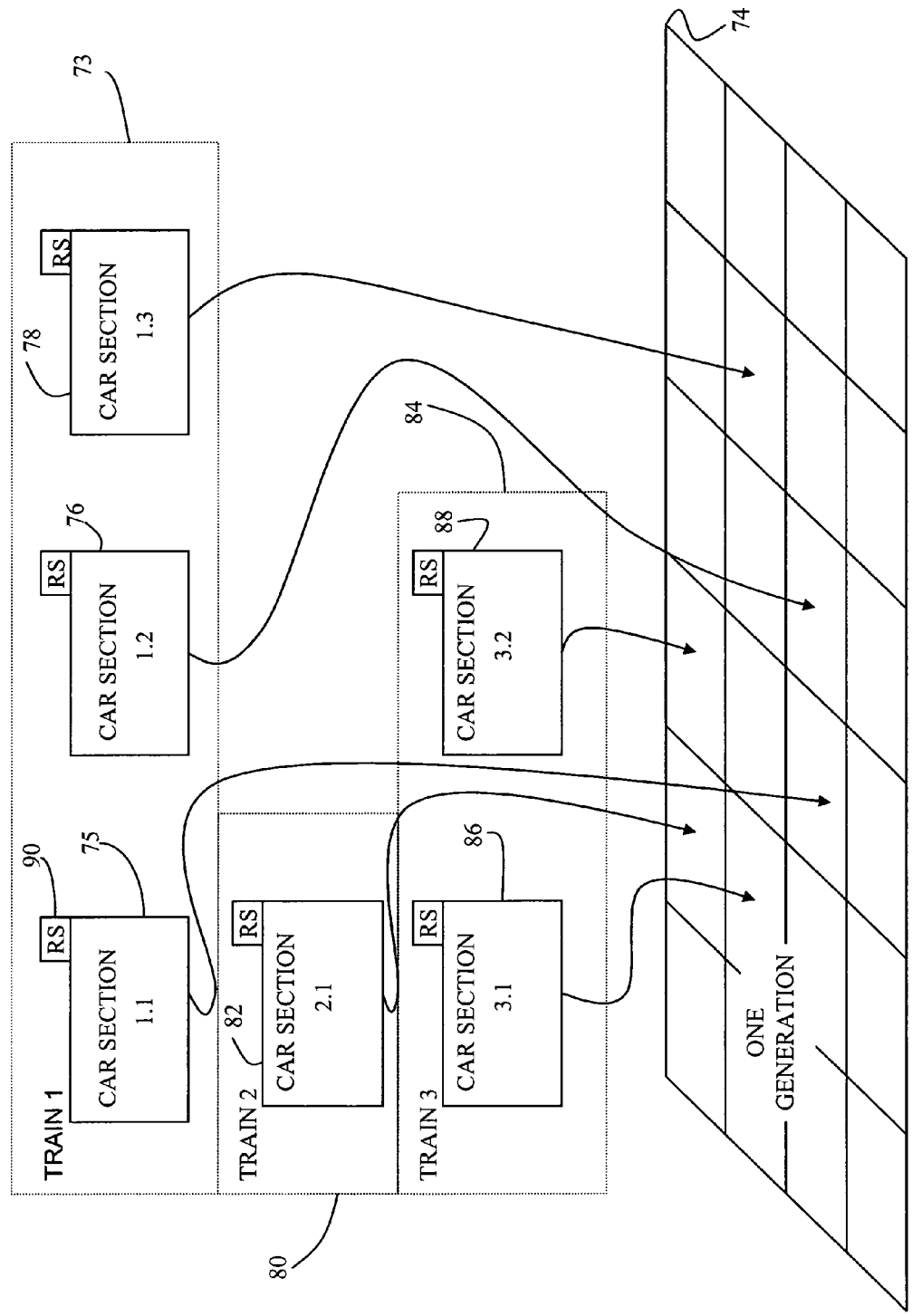
FIG. 7, discussed above, is a diagram that illustrates a generation organization employed for the train algorithm.
Figure 8A:
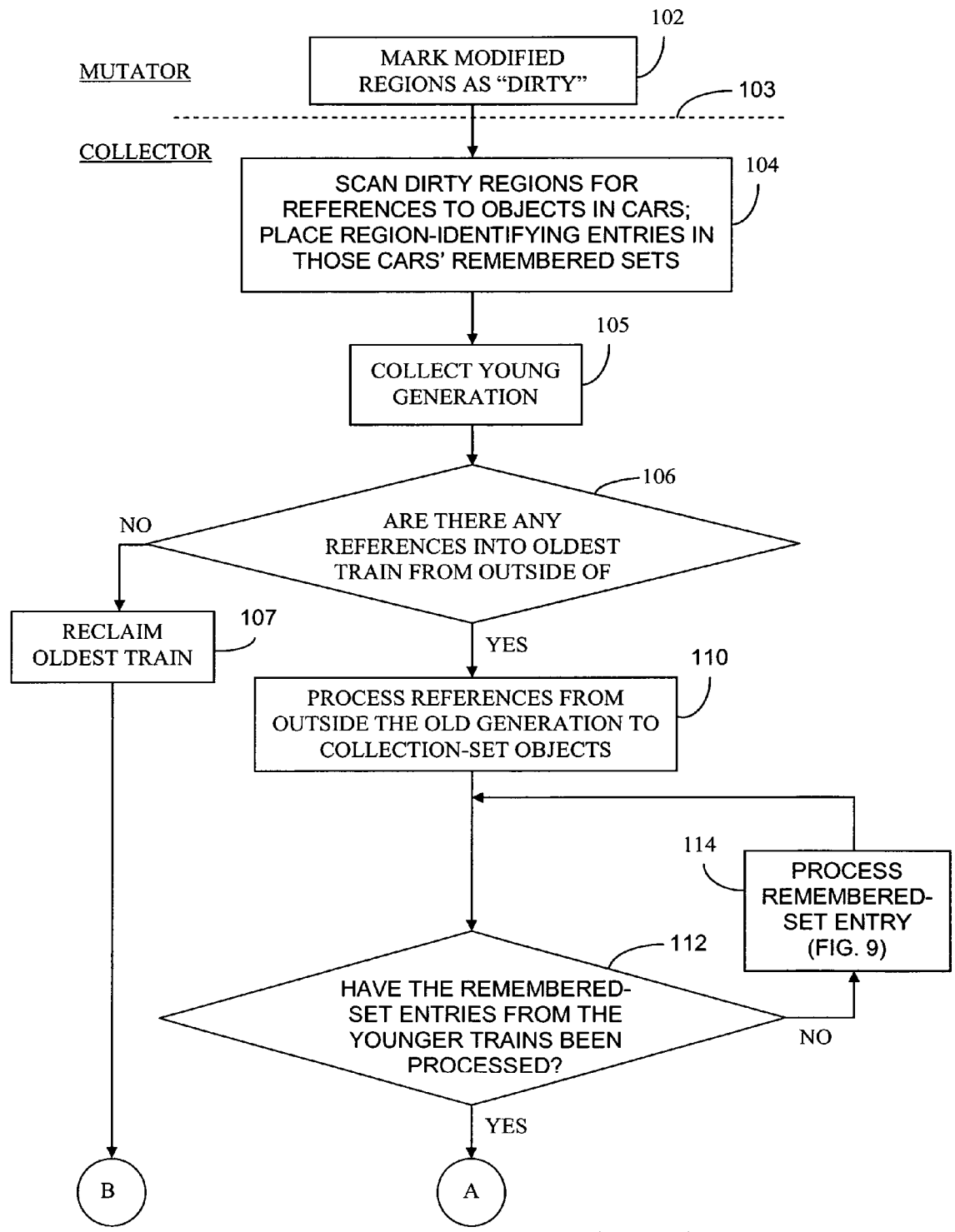
FIGS. 8A and 8B, discussed above, together constitute a flowchart that illustrates a garbage-collection interval that includes old-generation collection.
Figure 8B:
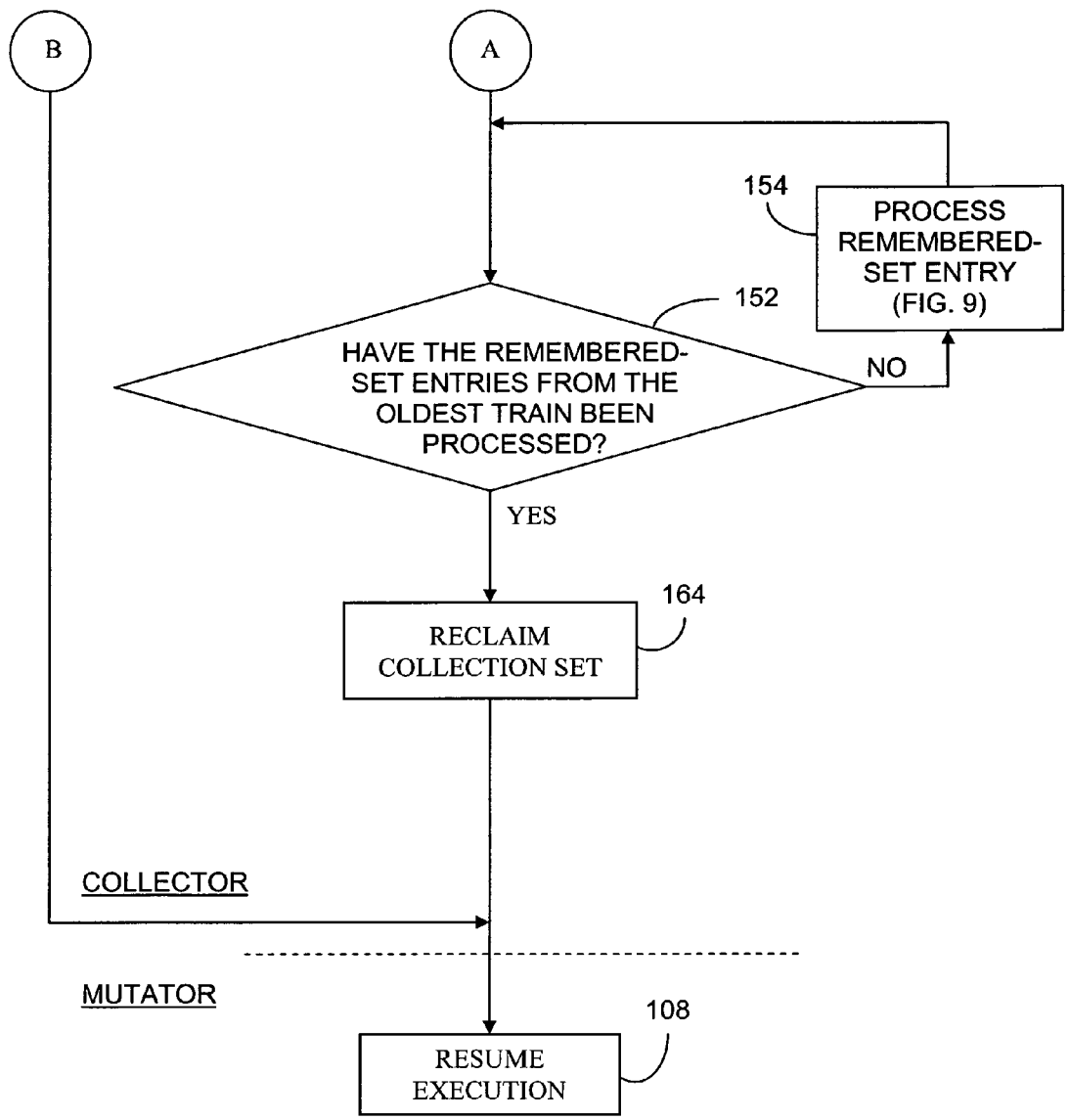
Figure 9:
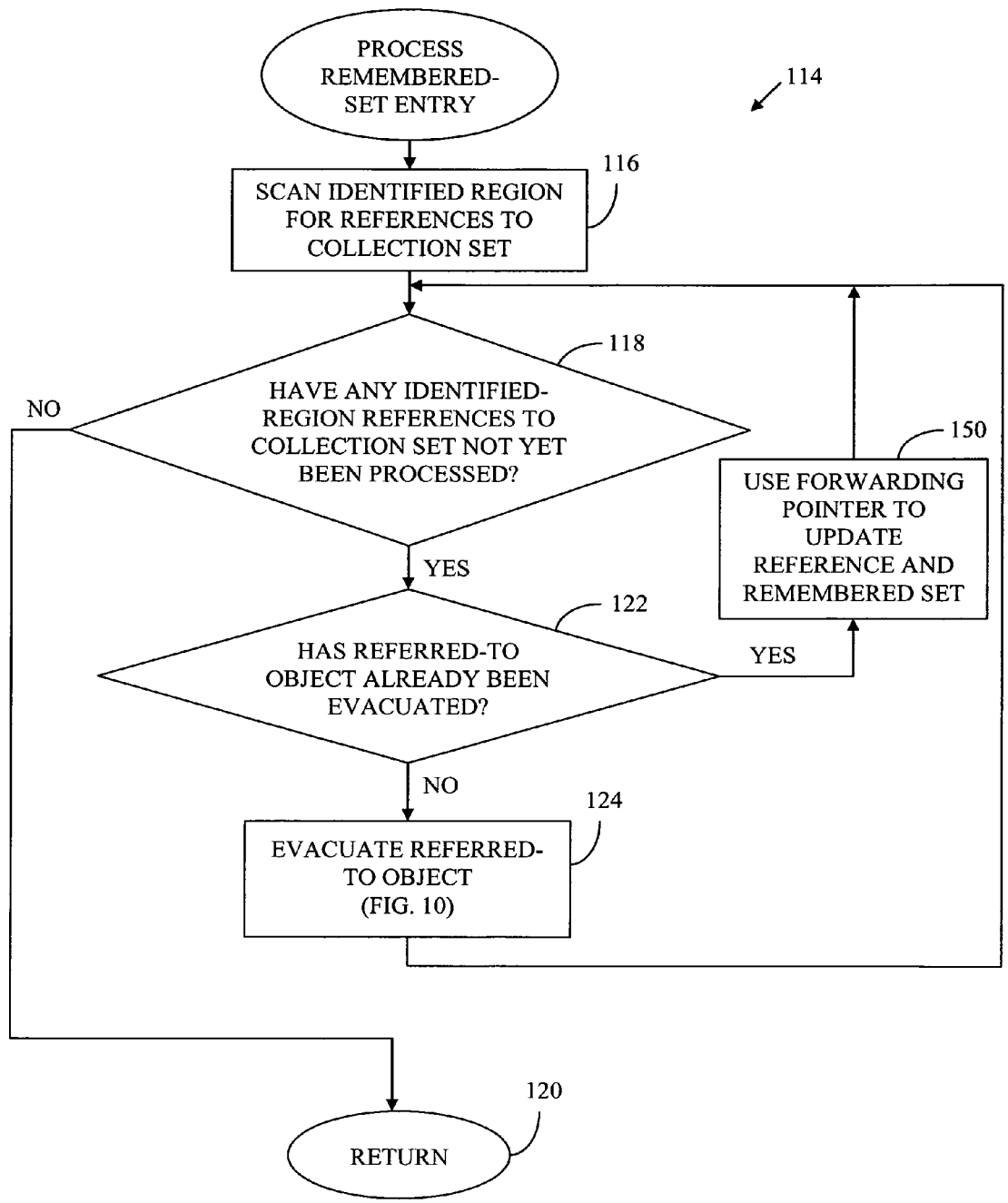
FIG. 9, discussed above, is a flowchart that illustrates in more detail the remembered-set processing included in FIG. 8A.
Figure 10:
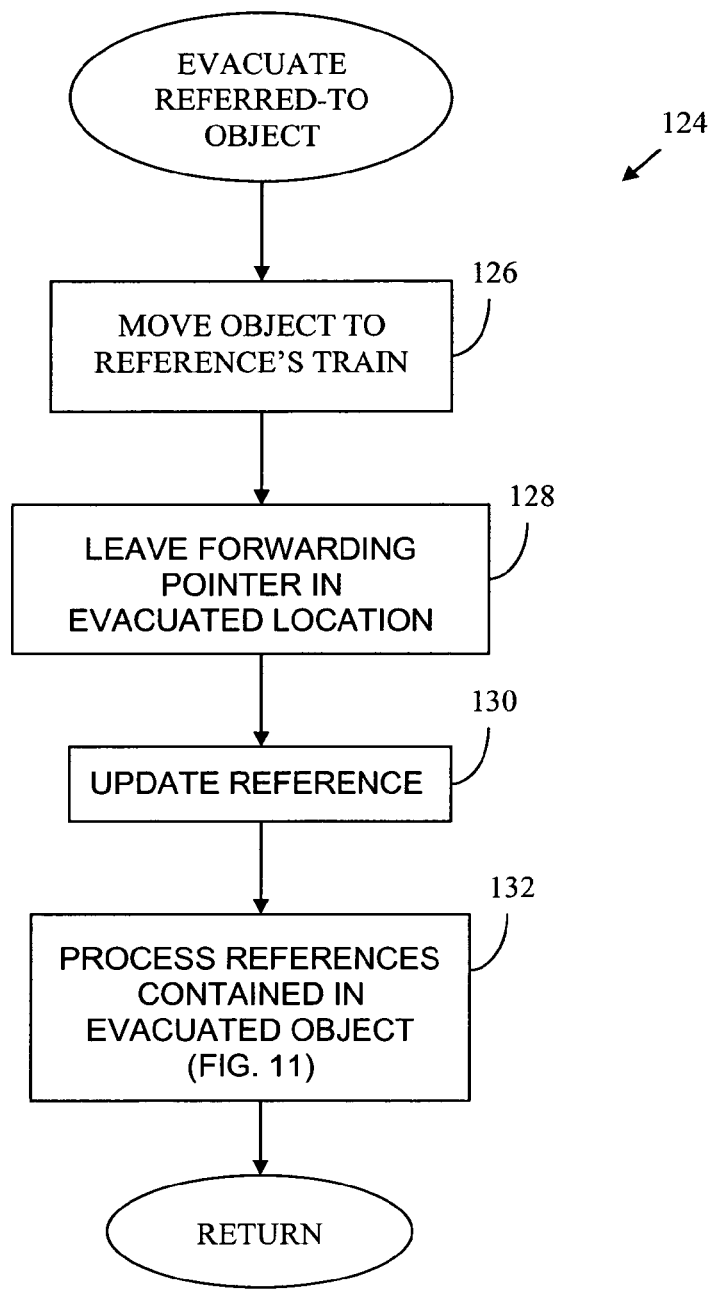
FIG. 10, discussed above, is a block diagram that illustrates in more detail the referred-to-object evacuation that FIG. 9 includes.
Figure 11A:
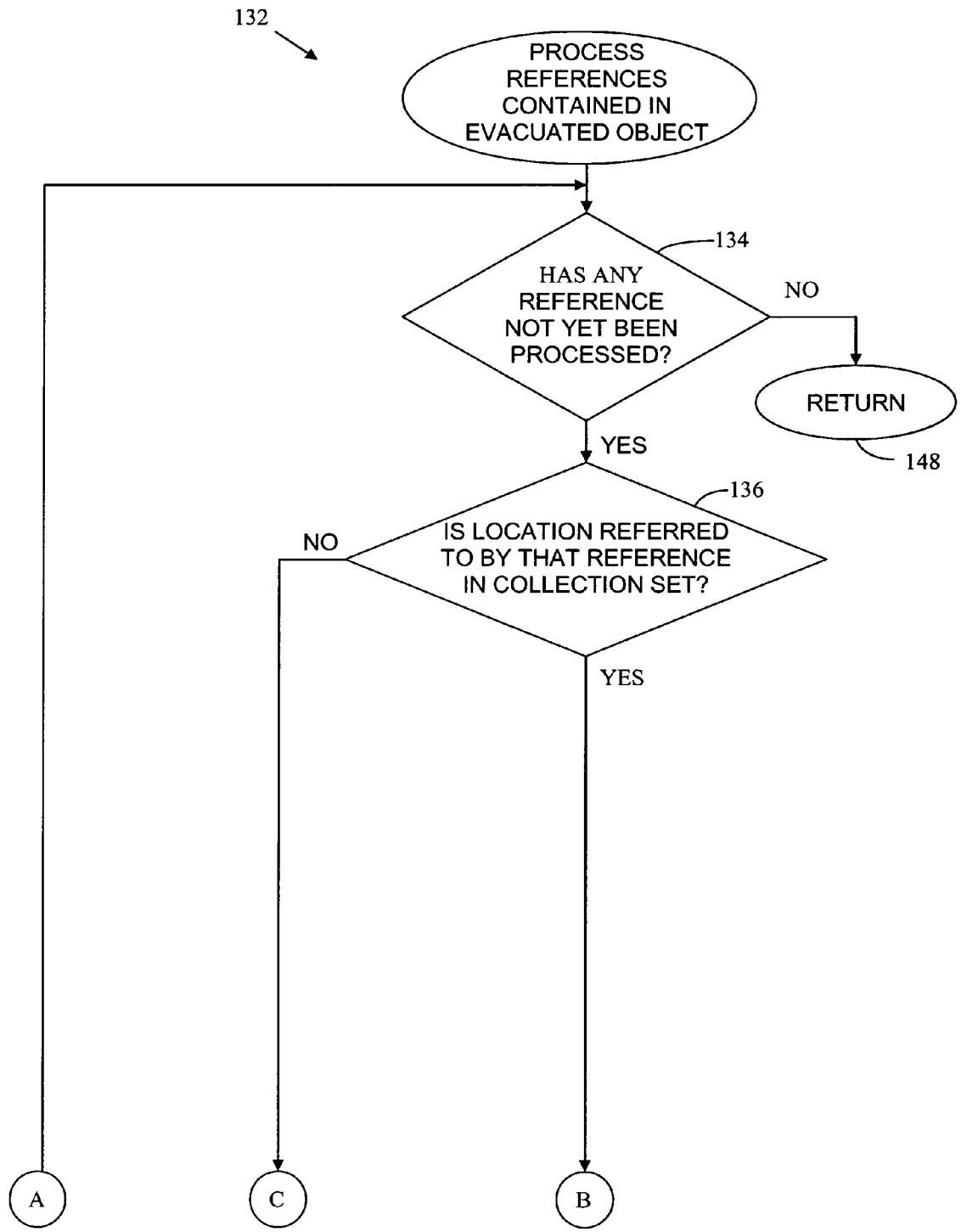
FIGS. 11A and 11B, discussed above, together form a flowchart that illustrates in more detail the FIG. 10 flowchart's step of processing evacuated objects' references.
Figure 11B:
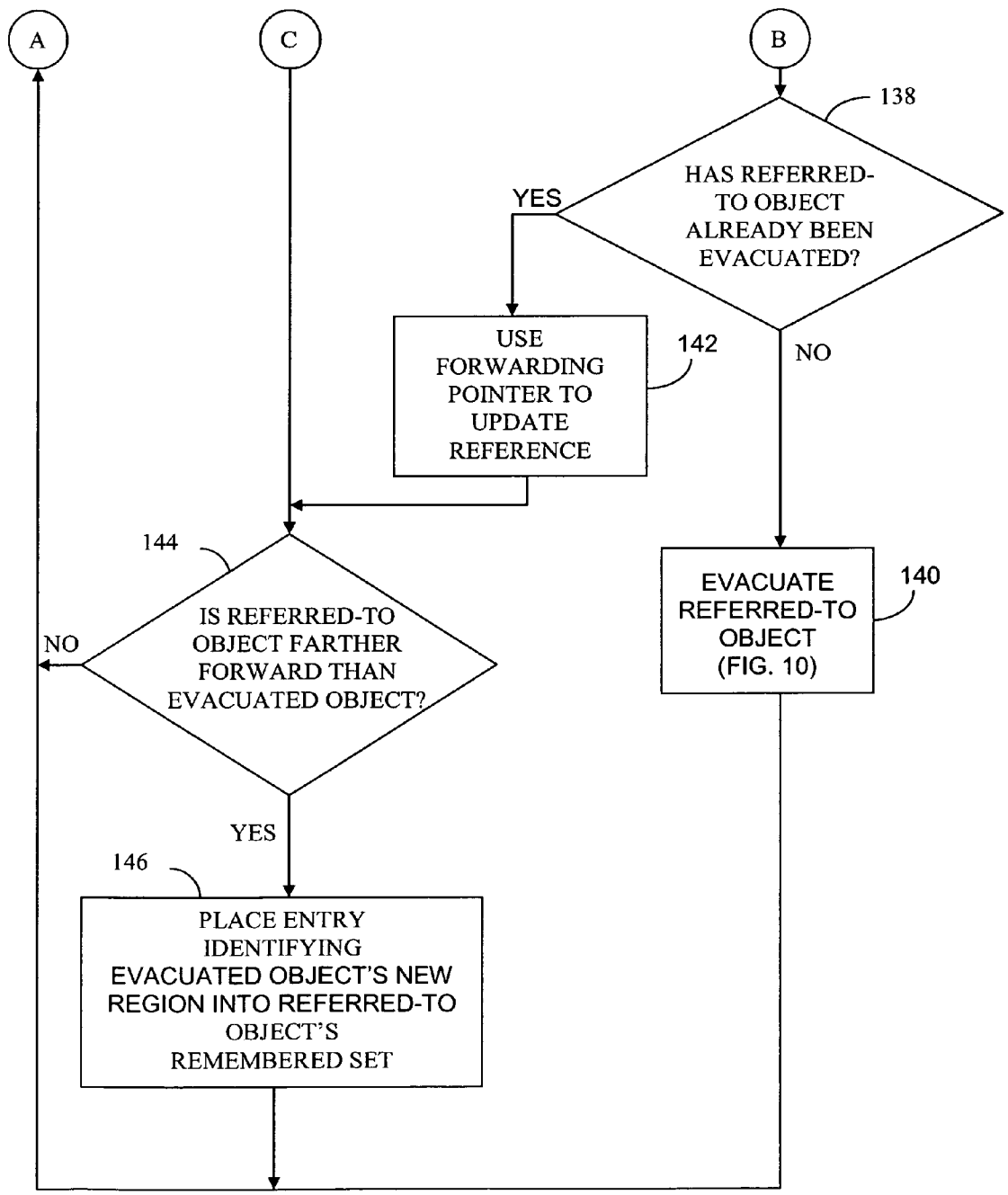
Figure 12A:
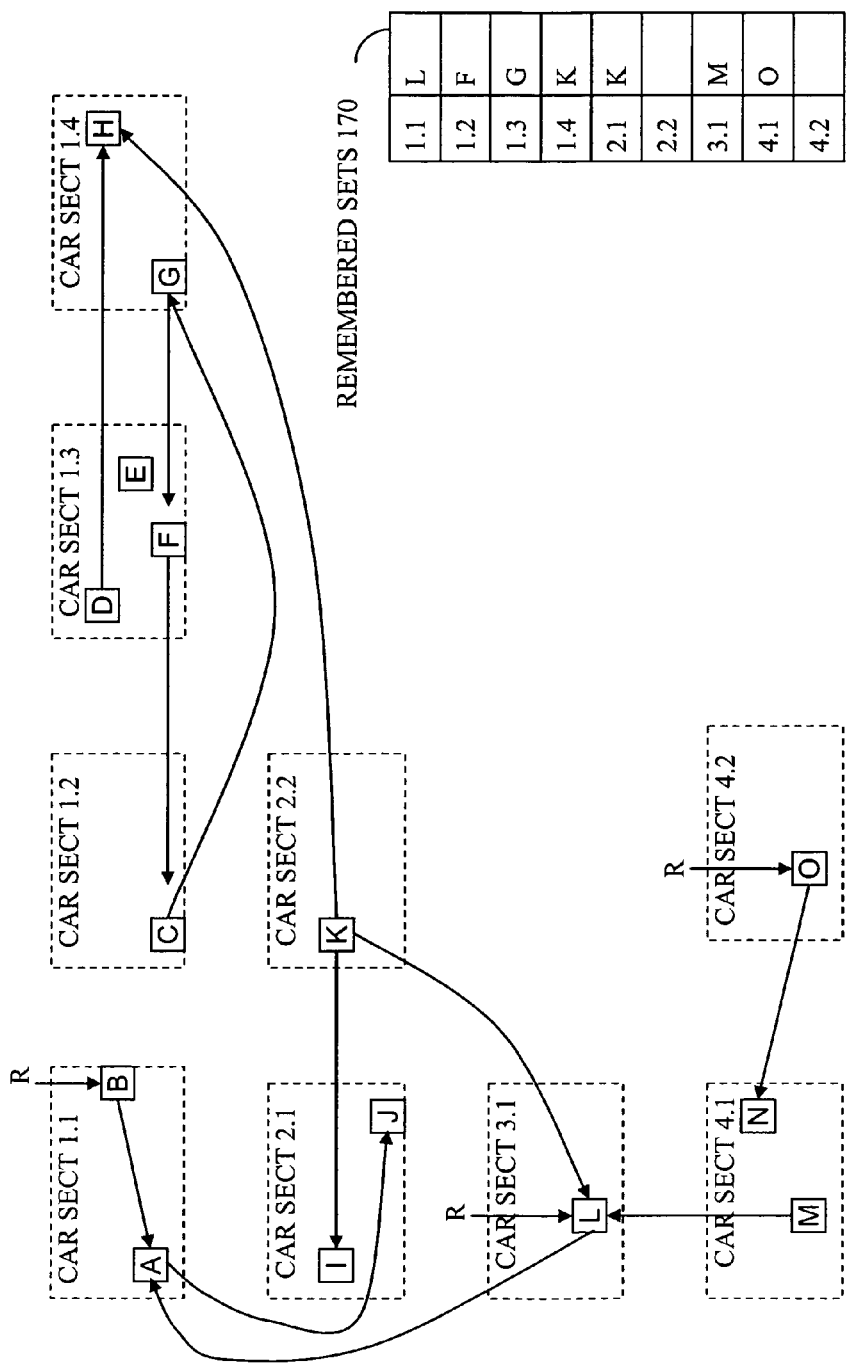
Figure 12B:
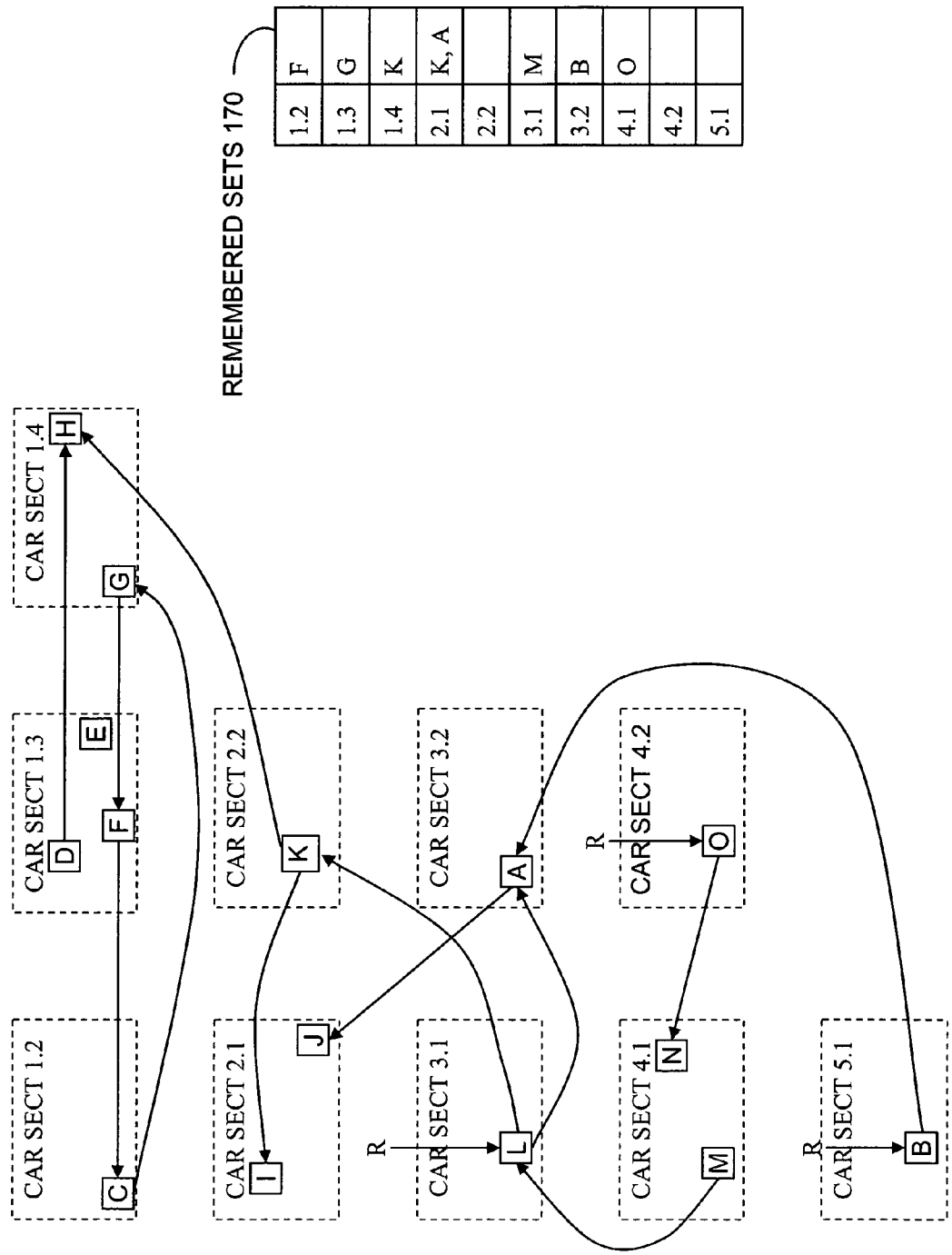
Figure 12C:
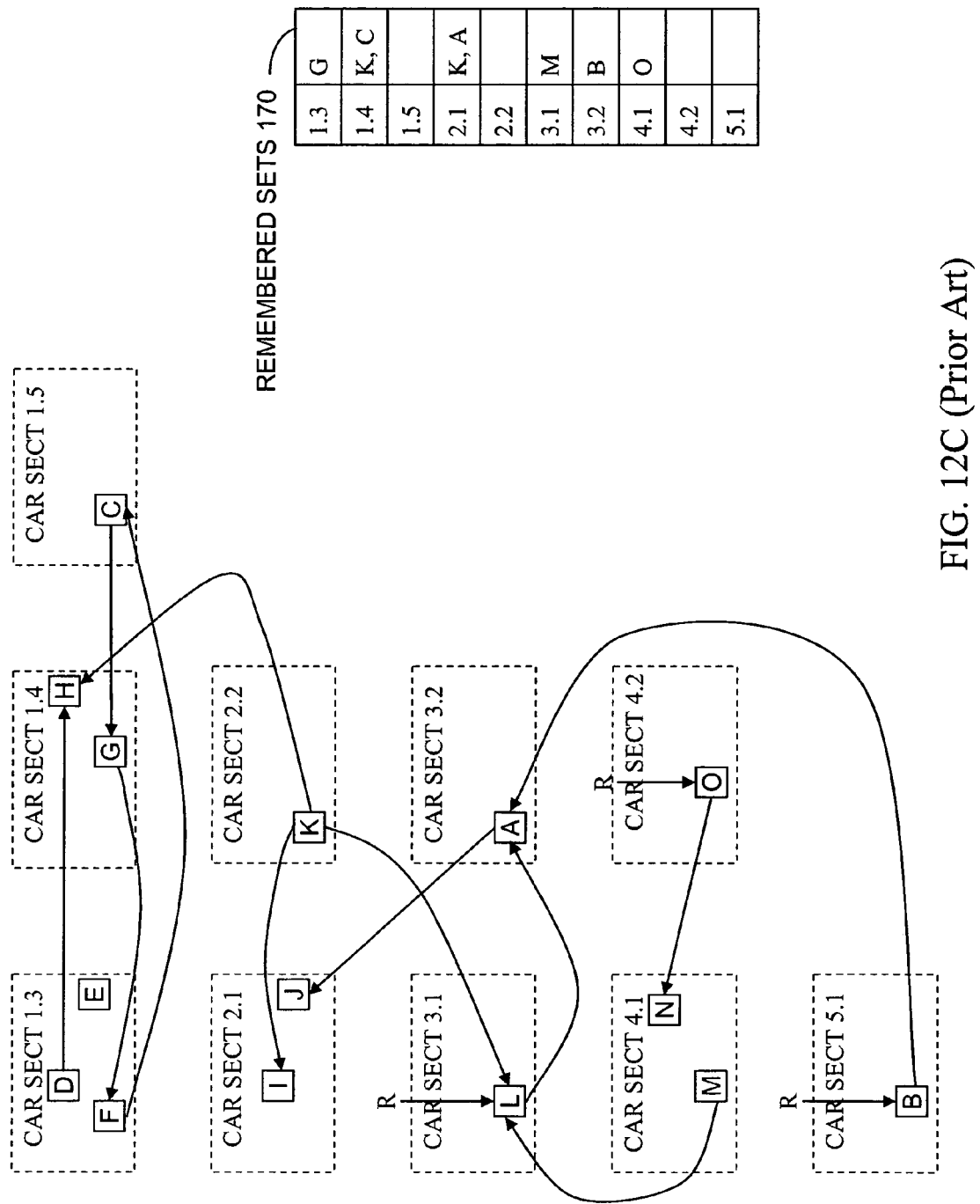
Figure 12D:
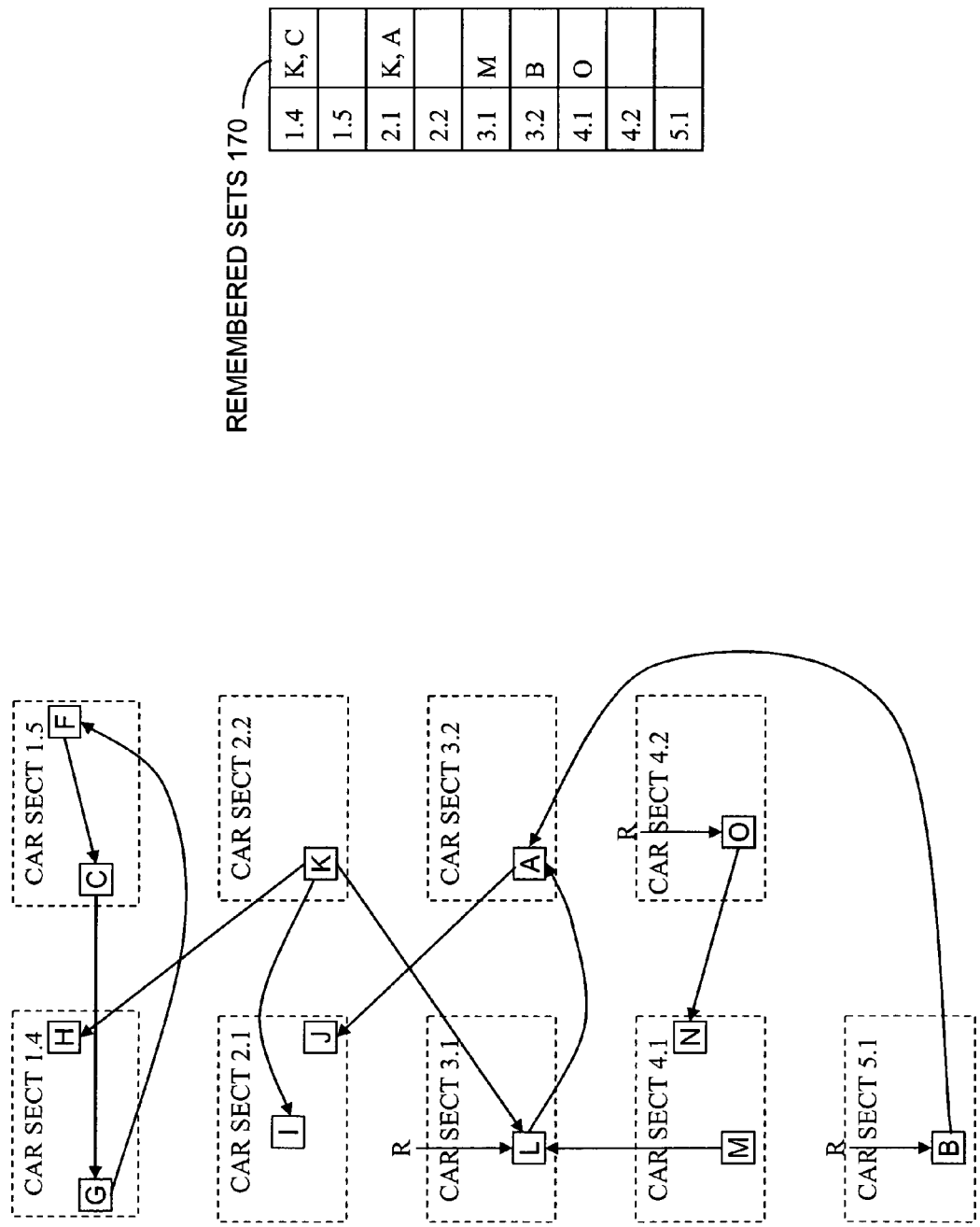
Figure 12E:
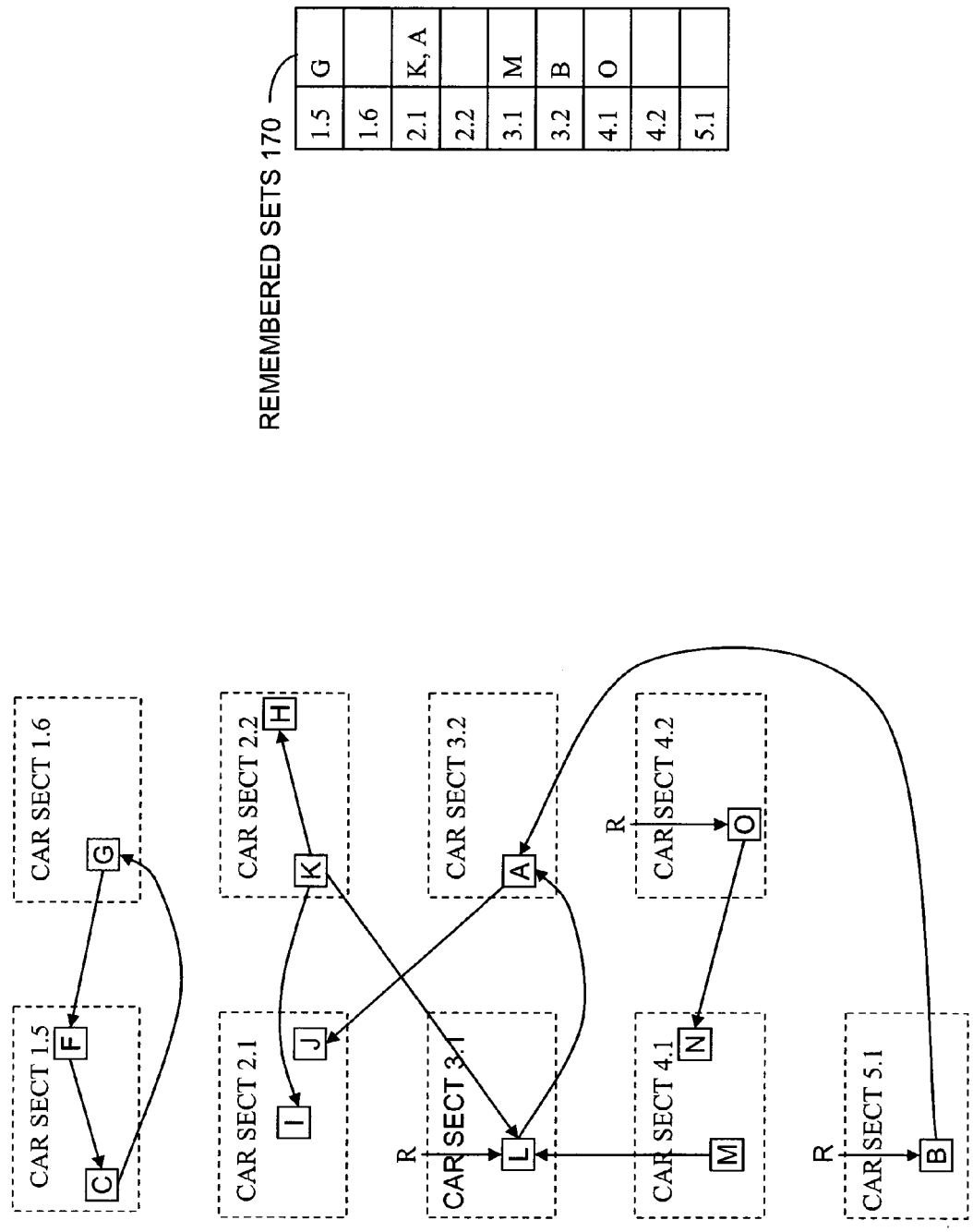
Figure 12F:
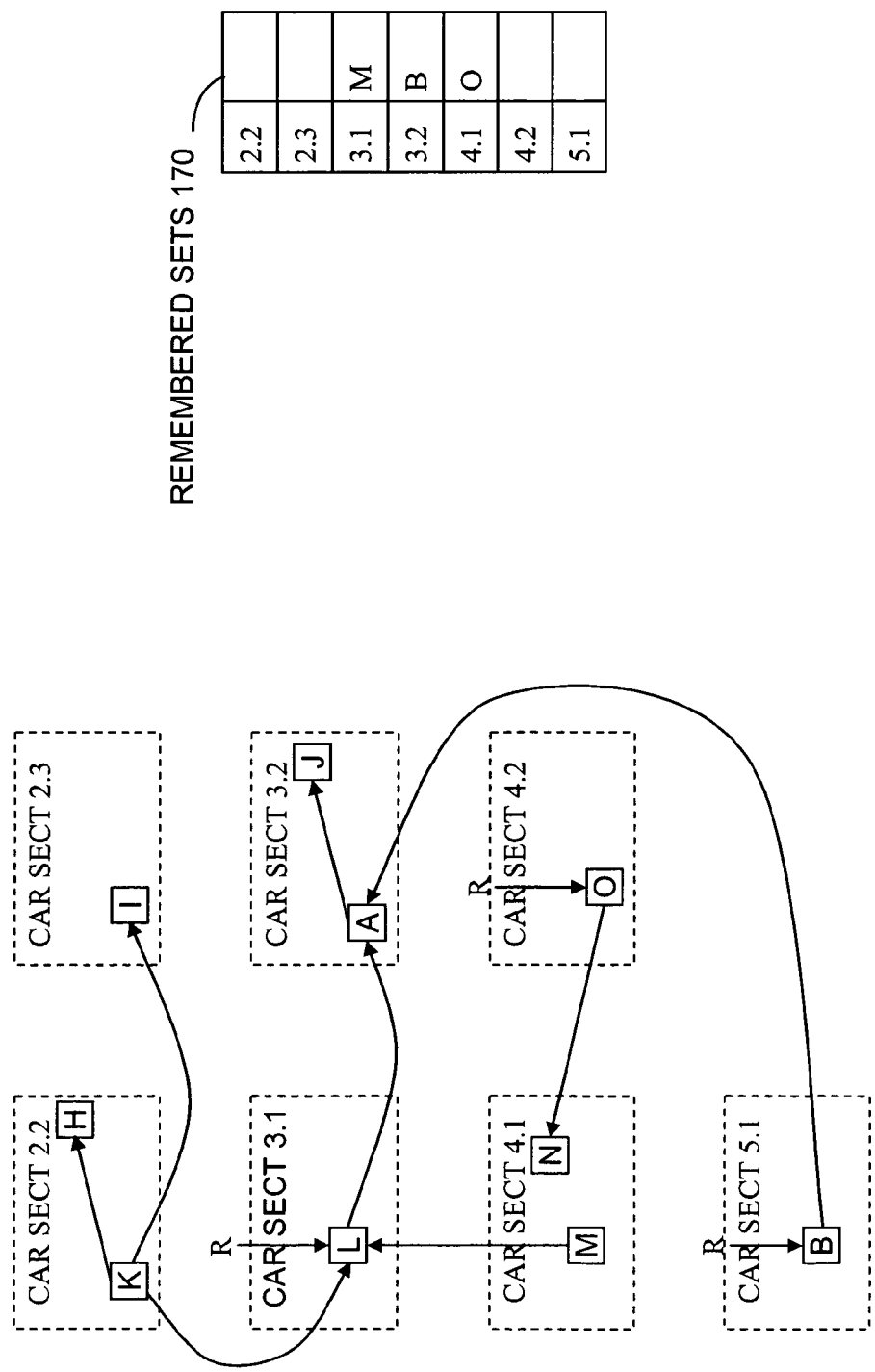
Figure 12G:
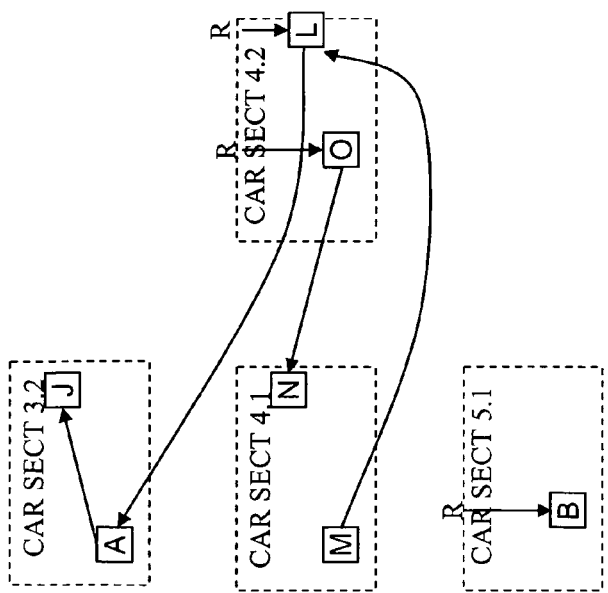
Figure 12H:
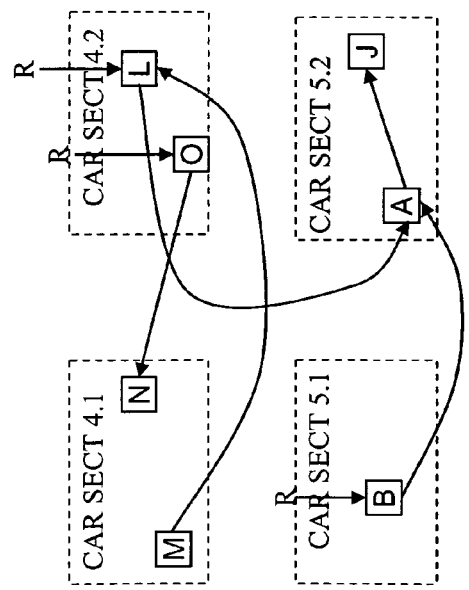

Although the present invention deals with incremental collection, it need not be practiced in a collector that, as the sequence of FIGS. 8A and 8B does, restricts collection activity to intervals dedicated only to collection. Nor, if it does so, need a full collection increment be performed entirely within a single such interval. Even if a full collection increment is performed within a single interval, the sequence followed during that interval need not be the same as the one described above in connection with FIGS. 8A, 8B, and 9–11.

Figure 13A:
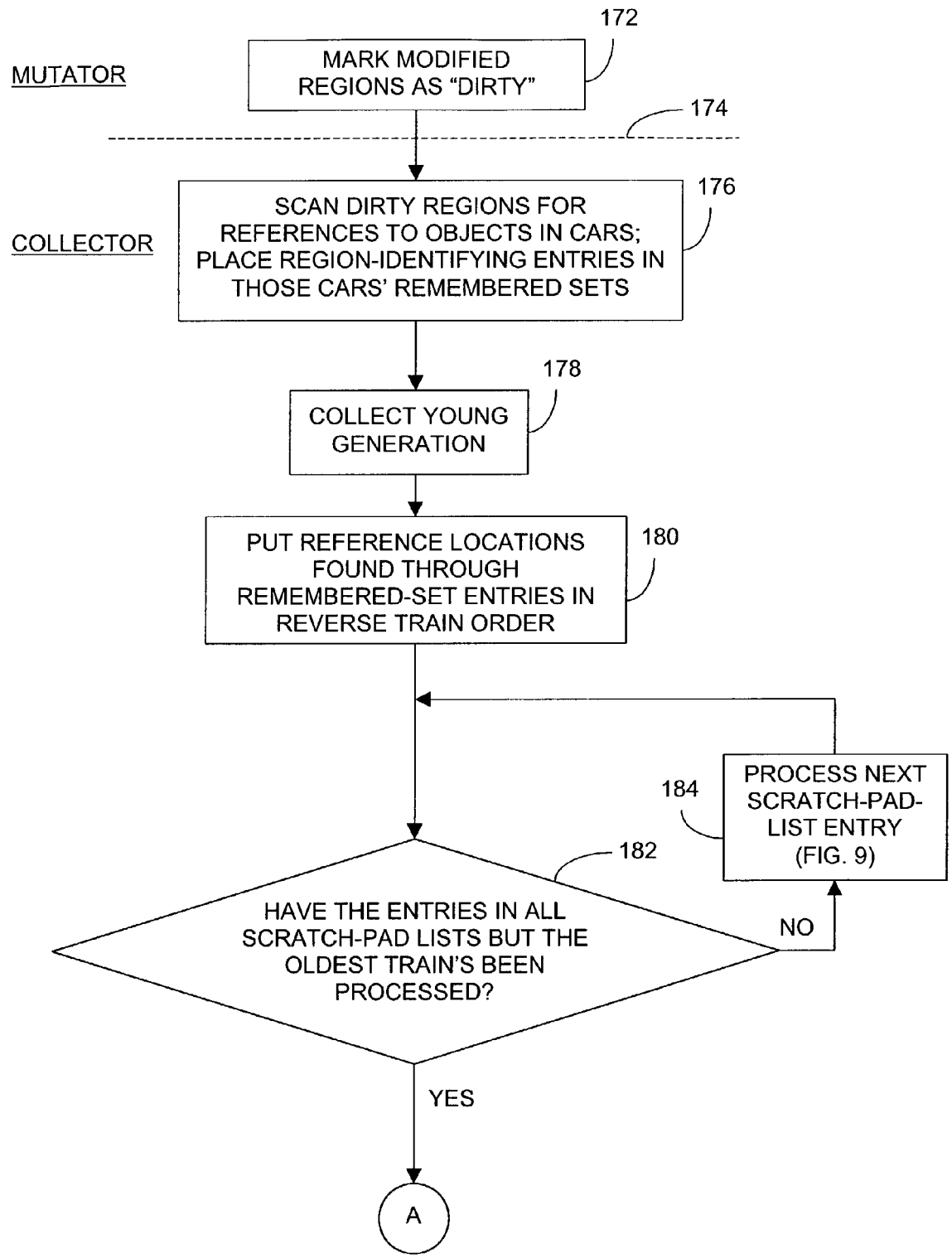
FIGS. 13A and 13B together constitute a flowchart that illustrates a collection interval, as FIGS. 8A and 8B do, but illustrates optimizations that FIGS. 8A and 8B do not include.
Figure 13B:
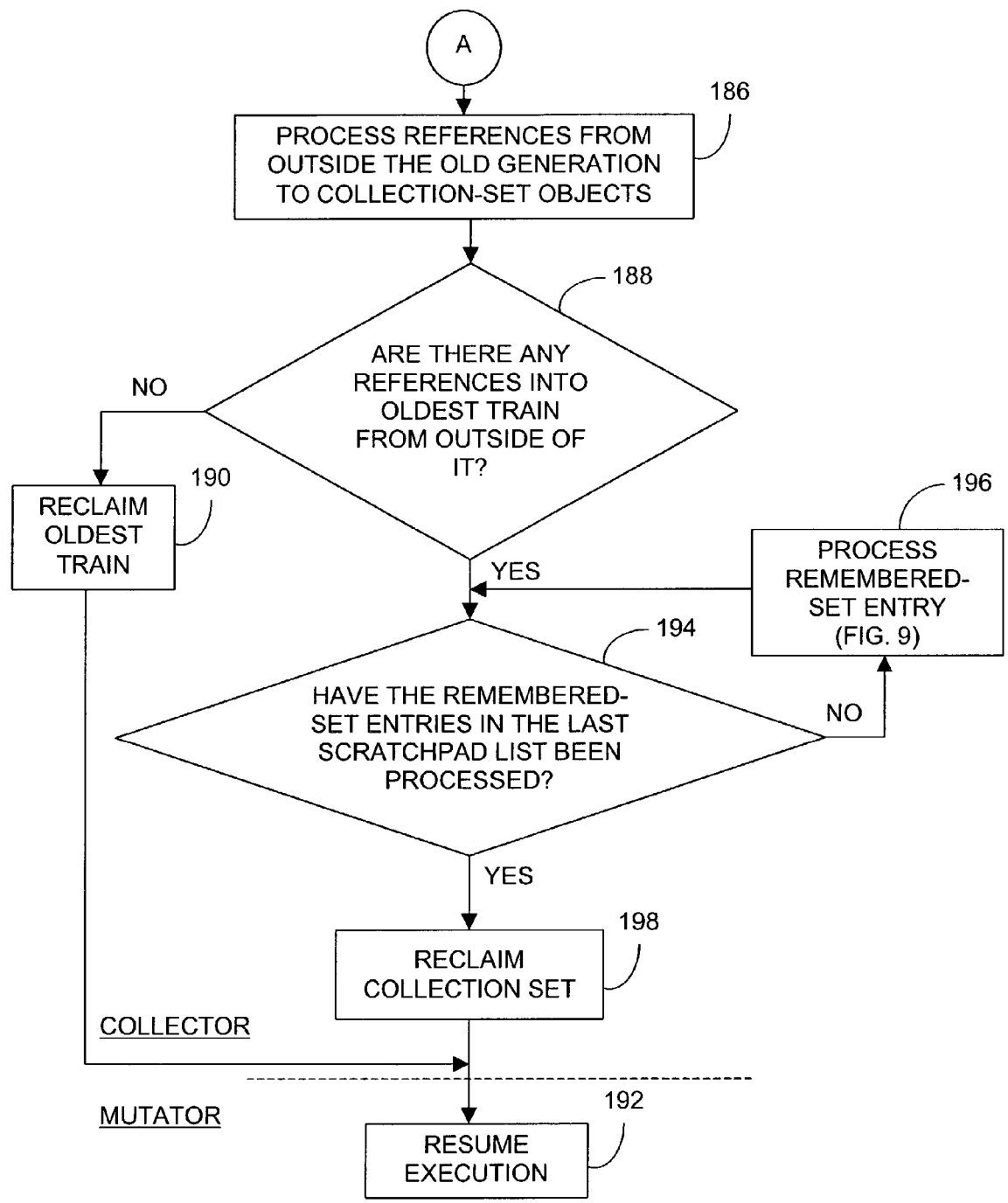

Indeed, the overall sequence that it follows will differ from that of FIGS. 8A and 8B in that it will precede actual object evacuation with creation of a list of the references that it has identified by scanning the locations that the collection set's remembered-set entries represent. To illustrate this, FIGS. 13A and 13B (together, "FIG. 13") depict an overall sequence that includes the evacuation ordering that lists arranged in accordance with the present invention can be used to support. As will be seen, the FIG. 13 sequence also differs in details that the present invention does not require but that are generally beneficial in embodiments that employ the train algorithm. For example, whereas it was tacitly assumed above that, as is conventional, only a single car section would be collected in any given collection interval, FIG. 13 reflects the possibility of multiple-car collection sets.

Blocks 172, 176, and 178 represent operations that correspond to those that FIG. 8's blocks 102, 106, and 108 do, and dashed line 174 represents the passage of control from the mutator to the collector, as FIG. 8's dashed line 104 does. For the sake of efficiency, though, the collection operation of FIG. 13 includes a step represented by block 180. In this step, the collector reads the remembered set of each car in the collection set to determine the location of each reference from a higher-order car into the collection set. It also places entries representing all references thereby found into a list. The nature of the entries placed in the list in accordance with the present invention will be discussed below. For the present, though, we merely note a list detail that the illustrated embodiment uses to facilitate the evacuation ordering that it employs. Specifically, the list is a composite of constituent lists associated with respective trains, and every reference represented by an entry in a given constituent list is located in a car section that belongs to the train associated with that constituent list. Since these lists are kept only for a single collection increment, we will refer to them as "scratch-pad" lists. The collector places the scratch-pad lists in reverse-train order, and, as blocks 182 and 184 indicate, it uses that order in processing the entries in all scratch-pad lists but the one associated with the oldest train.

Before the collector processes references in that train's scratch-pad list, the collector evacuates any objects referred to from outside the old generation, as block 186 indicates. To identify such objects, the collector scans the root set. In some generational collectors, it may also have to scan other generations for references into the collection set. For the sake of example, though, we have assumed the particularly common scheme in which a generation's collection in a given interval is always preceded by complete collection of every (in this case, only one) younger generation in the same interval. If, in addition, the collector's promotion policy is to promote all surviving younger-generation objects into older generations, it is necessary only to scan older generations, of which there are none in the example; i.e., some embodiments may not require that the young generation be scanned in the block-186 operation.

For those that do, though, the scanning may actually involve inspecting each surviving object in the young generation, or the collector may expedite the process by using card-table entries. Regardless of which approach it uses, the collector immediately evacuates into another train any collection-set object to which it thereby finds an external reference. The typical policy is to place the evacuated object into the youngest such train. As before, the collector does not attempt to evacuate an object that has already been evacuated, and, when it does evacuate an object to a train, it evacuates to the same train each collection-set object to which a reference in the thus-evacuated object refers. In any case, the collector updates the reference to the evacuated object.

When the inter-generational references into the generation have thus been processed, the garbage collector determines whether there are any references into the oldest train from outside that train. If not, the entire train can be reclaimed, as blocks 188 and 190 indicate.

As block 192 indicates, the collector interval typically ends when a train has thus been collected. If the oldest train cannot be collected in this manner, though, the collector proceeds to evacuate any collection-set objects referred to by references whose locations the oldest train's scratch-pad list includes, as blocks 194 and 196 indicate. It removes them to younger cars in the oldest train, again updating references, avoiding duplicate evacuations, and evacuating any collection-set objects to which the evacuated objects refer. When this process has been completed, the collection set can be reclaimed, as block 198 indicates, since no remaining object is referred to from outside the collection set: any remaining collection-set object is unreachable. The collector then relinquishes control to the mutator.

We now return to the step represented by FIG. 13's block 180, in which locations identified by remembered-set entries are scanned for references to collection-set objects and entries are made in scratch-pad lists associated with the trains in which such references are found. Now, the number of references to objects in the collection set may be large, but the size of the remembered set may have been kept manageable by specifying reference locations coarsely enough. Typically, the metadata associated with a given car's collection set will specify the granularity with which reference locations are specified. In many cases, the remembered set's granularity indicator will indicate that each remembered-set entry specifies the beginning address of a region whose size is only that of a single reference. That is, the "region" to be scanned is only a single word. In that case, the collector merely reads the word at that address and determines whether the contents refer to a location in the collection set. If they do, that address is simply placed into a scratch-pad list, typically the one associated with the train to which the car section containing that reference belongs. If the contents of that location no longer refer into the collection set, of course, no entry is made.

But the remembered set's metadata sometimes specify a coarser granularity. When they do, the collector has to scan a region, which we will call an "RS region," that may contain more than one reference. In collectors in which the granularity indicators are kept on a per-car basis, it is beneficial to begin scratch-pad-list generation with the coarsest-granularity remembered set and to keep track of which regions in the generation have thereby been scanned already. This enables the collector to avoid re-scanning the same regions in response to subsequent remembered sets' entries.

Figure 14:
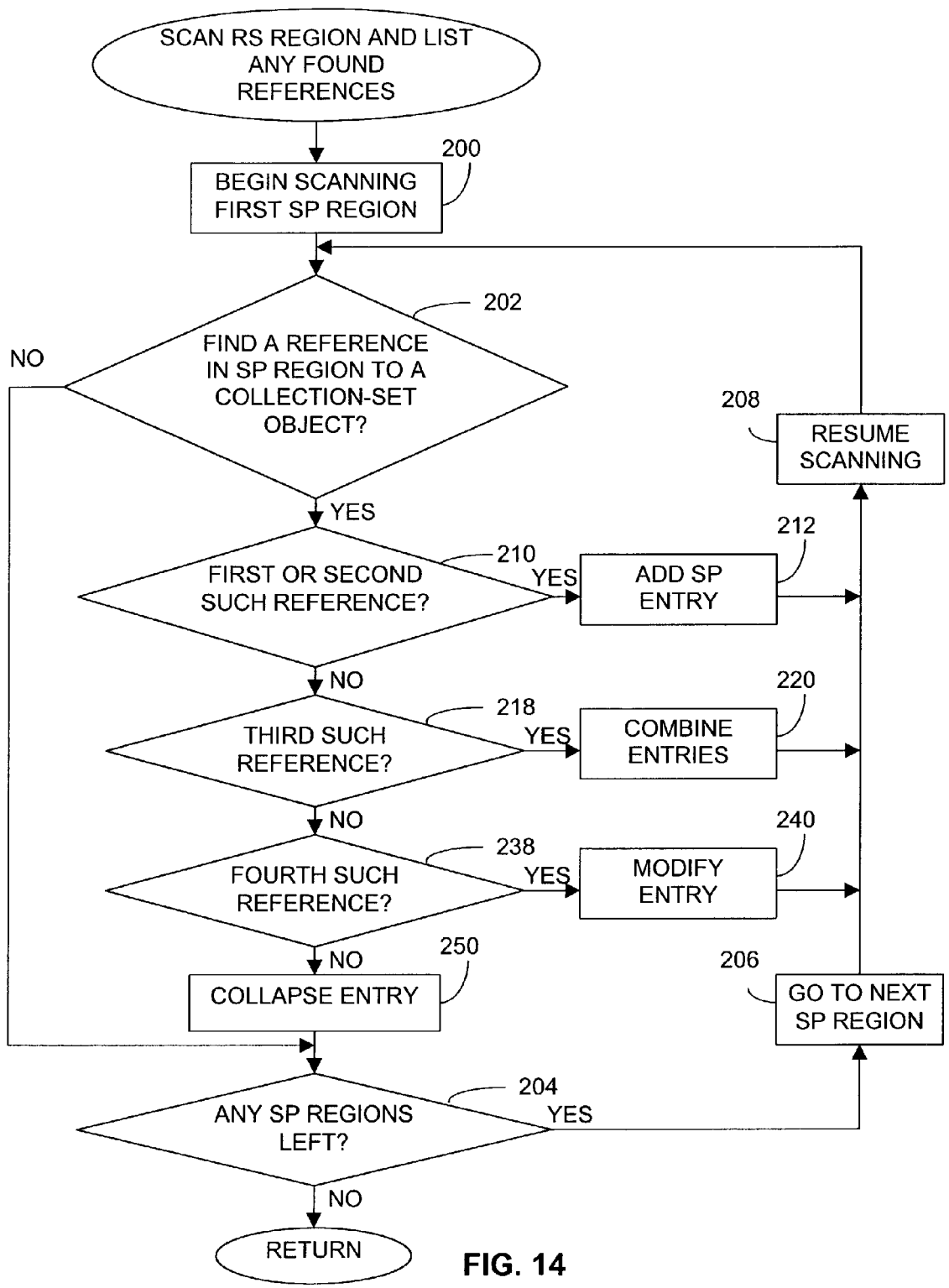
FIG. 14 is a flowchart of a routine for making processing remembered-set entries to find references into the collection set and memorializing the results in per-train scratch-pad lists.

FIG. 14 is a flowchart of a routine that can be used to generate scratch-pad-list entries from remembered-set entries that represent regions large enough to contain more than one entry. Each RS region is scanned for references into the collection set, and scratch-pad-list entries are made to memorialize the locations of references thus made. According to the present invention, though, a resultant individual entry in the scratch-pad list may identify locations of more than one reference into the collection set.

In the illustrated embodiment, each multiple-reference scratch-pad entry represents every reference in a corresponding region, which will be referred to here as an "SP region." For the sake of concreteness, let us say that all multiple-reference SP regions are of the same size and that this common SP-region size is, say, 512 bytes. In a 32-bit machine, that is, a multiple-reference SP region could hold as many as 128 references. On the other hand, we will assume that the sizes of multiple-reference RS regions can vary from remembered set to remembered set. Again for the sake of concreteness, though, we will assume that the minimum size of a multiple-reference RS region is the same as the size of a multiple-reference-representing SP region and that the sizes of all multiple-reference RS regions are some multiple of this minimum.

FIG. 14's block 200 represents starting with the first SP region within an RS region to be scanned. (In an embodiment in which an RS region can be smaller than an SP region, the operation corresponding to the one that block 200 represents could include only scanning the part of the SP region that is within the RS region.) As blocks 202, 204, 206, and 208 indicate, the collector proceeds from SP region to SP region within the RS region until it finds a reference into the collection set or completes its scanning of the RS region. As blocks 210 and 212 indicate, the result in the illustrated embodiment of finding the first reference within a given SP region or a second reference in the same SP region is to add to the scratch-pad list an entry that specifies the reference's location. In the illustrated embodiment, the entry in that case is simply the reference's address. Consider the address, CAFEB418$_{16}$, depicted in the top row of FIG. 15. Reference numeral 214 in that drawing represents a scratch-pad list, showing the (single-word) array slot in which the entry corresponding to that address is made and further showing that entry's binary representation. Note that the two least-significant bits are zeros. In the illustrated embodiment, this is characteristic of reference addresses. Reference addresses are always aligned on word boundaries, so the fact that an address is a reference's address implies that its two least-significant bits are zeros. We will refer to those bits as the address's "implicit part," while the remainder will be called its "explicit part."

Figure 15:
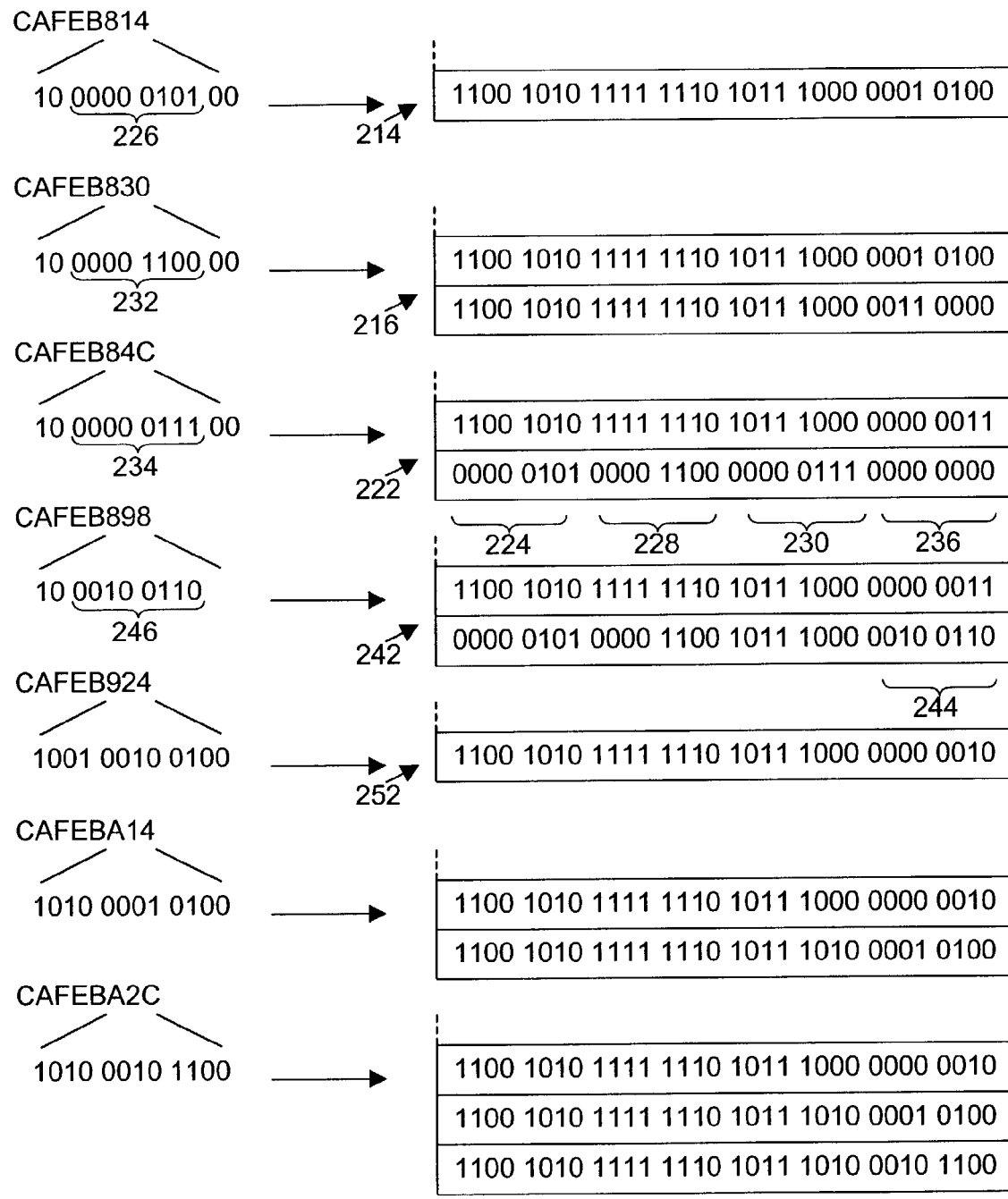
FIG. 15 is a diagram showing scratch-pad-list entries being made.

Now suppose that the next reference into the collection set that the collector finds by scanning the region associated with the remembered-set entry is CAFEB830$_{16}$, as FIG. 15's second row indicates. This falls within the same SP region as the previous reference's address. Reference numeral 216 refers to a representation of the scratch-pad-list state that results. Here again, the bottom slot simply contains the reference's address.

If yet another reference is found within the same SP region, the determination made in the step that FIG. 14's block 210 represents yields a negative result: this is not the first or second reference in the SP region. Instead, it is the third such reference, and the determination represented by FIG. 14's block 218 yields an affirmative result, so the collector proceeds, as block 220 indicates, to combine entries. FIG. 15's third row depicts the result.

Specifically, reference numeral 222 refers to a representation of a scratch-pad list in which the penultimate slot no longer contains the address of the first reference found within that SP region. Instead, it contains the sum of 11$_2$ and the address at which that SP region begins. That is, the two least-significant bits of the region address's implicit (all-zeros) part is replaced with 11$_2$. In the illustrated embodiment, that value is a code indicating that the entry continues in the next word, which should be interpreted as a list of identified references' offsets, in terms of words, from the start of the SP region. That second word's first byte, referred to by reference numeral 224, indicates that the first reference is located five words (twenty bytes) from the start of the SP region. That byte consists of the eight least-significant bits of the explicit part of the first reference's address: those bits are the same as the bits referred to by reference numeral 226. The next two one-byte sequences 228 and 230 are similarly identical to sequences 232 and 234 in the explicit parts of the second and third references' addresses. The last one-byte sequence 236 consists of all zeros. Unless it is at the beginning of the word, an all-zero sequence does not represent an offset; it means that there are no further references in the list.

Note that the third row's offset-list approach could have been used to represent two references' locations in the same SP region. But the use of two full addresses as in the second row takes up no more memory words, and it requires no offset calculations. It also requires no address calculation when the collector goes back to use the scratch-pad-list entries.

As FIG. 14's blocks 238 and 240 indicate, the collector modifies that last entry if the SP region includes a fourth reference to a collection-set object. If the address of the fourth reference to be found is CAFEB898$_{16}$, for example, the result is the scratch-pad-list state referred to by reference numeral 242. That state is the same as the one referred to by reference numeral 222, with the exception that the last one-byte sequence 244 now contains the byte 246 at the end of the fourth reference address's explicit part.

In the illustrated embodiment, a given entry can contain at most four offsets in its list, so a new entry could be started if another reference is found in the same SP region. To bound the size of the scratch-pad list, though, the illustrated embodiment instead collapses the current entry, as FIG. 14's blocks 238 and 250 indicate, into a single-word entry such as that illustrated by FIG. 15's list representation 252. As that representation indicates, the sole word of which the entry now consists is the sum of 10$_2$ and the SP region's address. The value 10$_2$ is a code representing the fact that the entry is a single word that gives only the SP region's starting address. That is, the entry does not list specifically where references are within the SP region; it merely states that the region contains at least five. Therefore the collector will need to re-scan that SP region when it uses the scratch-pad list for evacuation.

Note that the collapsing operation that block 250 represents reduces the length of the scratch-pad list by one word. In embodiments that allocate memory for a scratch-pad lists in "chunks," this can cause inconvenience if, as in the illustrated embodiment, temporary values such as those depicted by scratch-pad-list representations 214, 216, 222, and 242 are placed in the scratch-pad list itself. Specifically, the second word of the temporary entry that is later collapsed may cause an additional chunk to be allocated unnecessarily. For this reason, some embodiments may not place such temporary values in the scratch-pad list.

The illustrated embodiment uses three different mode-indicating values: 00$_2$ for an entry containing the precise address of a single reference, 11$_2$ for a single-word entry containing the address of an SP region in which multiple references can be found but not indicating where within the region where to find them, and 10$_2$ for a two-word entry in which the second word is an offset list. This correspondence between values and meanings is arbitrary, of course; other correspondences can be used just as well.

And different embodiments of the invention may use different entry formats. If the system's word size is different, of course, then the number of offset values that a single-word offset list can contain will differ, too. And different-sized SP regions will typically dictate different numbers of bits in the representations of the offsets. In systems whose reference alignments are coarser—and in which there therefore are more bits in the address's implicit part—the number of possible mode-indicator codes could be greater. Even with only a two-bit implicit part, moreover, there could be four codes instead of three. For example, a fourth value, $01_2$, could added to the three above and mean that the offset list extends for two words rather than only one. Or it could mean that there is no offset list but that the size of the region represented by the entry is different from that represented by an entry ending in $10_2$.

Also, note that the seven bits that precede the first word's terminal $11_2$ are all zeros in the illustrated embodiment when the entry is a multiple-word entry that includes an offset list. This is not a coincidence; it results from the fact that SP regions are aligned on 128-word boundaries. So, whereas the illustrated embodiment uses only a single-word slot for an offset list and leaves the number of offsets in the list implicit, other embodiments may instead use those seven bits as an extension of the mode indicator to indicate how many offsets there are in the offset list—and thereby how many words are used to contain it. In keeping with the goal of bounding the size of the scratch-pad list, though, most such embodiments will limit the length of the offset list, reverting to scanning the entire SP region at evacuation time if necessary to avoid making the offset list too long.

To focus on the encoding operation, FIG. 14's blocks 204 and 206 indicate that the collector moves on to any further SP region remaining in the RS region once the collector has collapsed a scratch-pad-list entry in response to having found a fifth reference in the region. That is, it depicts no further scanning of the SP region, since that region will need to be scanned anyway when the collector performs the evacuation process. In practice, though, many embodiments will continue the scanning at this point for other reasons, such as to keep a tally of the various collection-set objects' "popularities."

As FIG. 15's sixth and seventh rows illustrate, the collector inserts further entries if it finds further references in subsequent SP regions.

The illustrated embodiment makes at least one scratch-pad-list entry for each remembered-set entry that results in finding a reference into the collection set. This is true even in the case of remembered-set entries that have single-reference granularity. This is not a requirement of the present invention, of course; there is nothing that would prevent a single previously unscanned SP region from containing references identified by a plurality of such single-reference remembered-set entries. As the collector processes remembered-set entries, for example, it could accumulate a list of where it thereby finds references and then generate a single scratch-pad-list entry representing the locations of all references thereby found in a single SP region.

Conversely, a single scratch-pad-list entry could be used to represent a plurality of normal-sized SP regions. To appreciate this and certain other alternative features, consider an encoding scheme in which a terminal $01_2$ means that replacing those bits with $00_2$ yields a pointer to a single reference, a terminal $11_2$ means that the preceding seven bits indicate how long the offset list is, and a terminal $0_2$ means, as the terminal $10_2$ does in the encoding illustrated above by reference to FIG. 15's list representation 252, that the region has to be scanned to find the references of interest. That value could additionally mean the entry can represent more than one normal-sized SP region, the number of such (contiguous) normal-sized SP regions being, say, one greater than the value represented by the preceding eight bits. Specifically, it could mean that all of the regions thereby represented need to be scanned to find the references they contain.

For instance, suppose that a collector employing this alternative embodiment encounters a coarse-granularity remembered-set entry representing an RS region consisting of many SP regions. Suppose further that, in the process of encoding an entry for one of those regions, it reaches a point in the routine similar to the one that FIG. 14's block 250 represents, namely, a point where the collector determines that it will not place in the entry an offset list long enough to specify all references individually. In addition to collapsing the current entry to eliminate the offset list, it would also check the previous entry to determine whether it ends in $0^2$ and represents at least the immediately preceding normal-sized SP region. If so, the collector increments that preceding entry's length code so that the preceding entry now also represents the SP region represented by the current entry, and it eliminates the now-redundant current entry. In the resultant value of the previous entry, that is, the first twenty-three bits will remain the same, equaling the corresponding bits of the first normal-sized region that it represents, the next eight bits will have been incremented to indicate how many regions behind that first region the just-added normal-sized region is, and the last bit will remain $0_2$.

Figure 16:
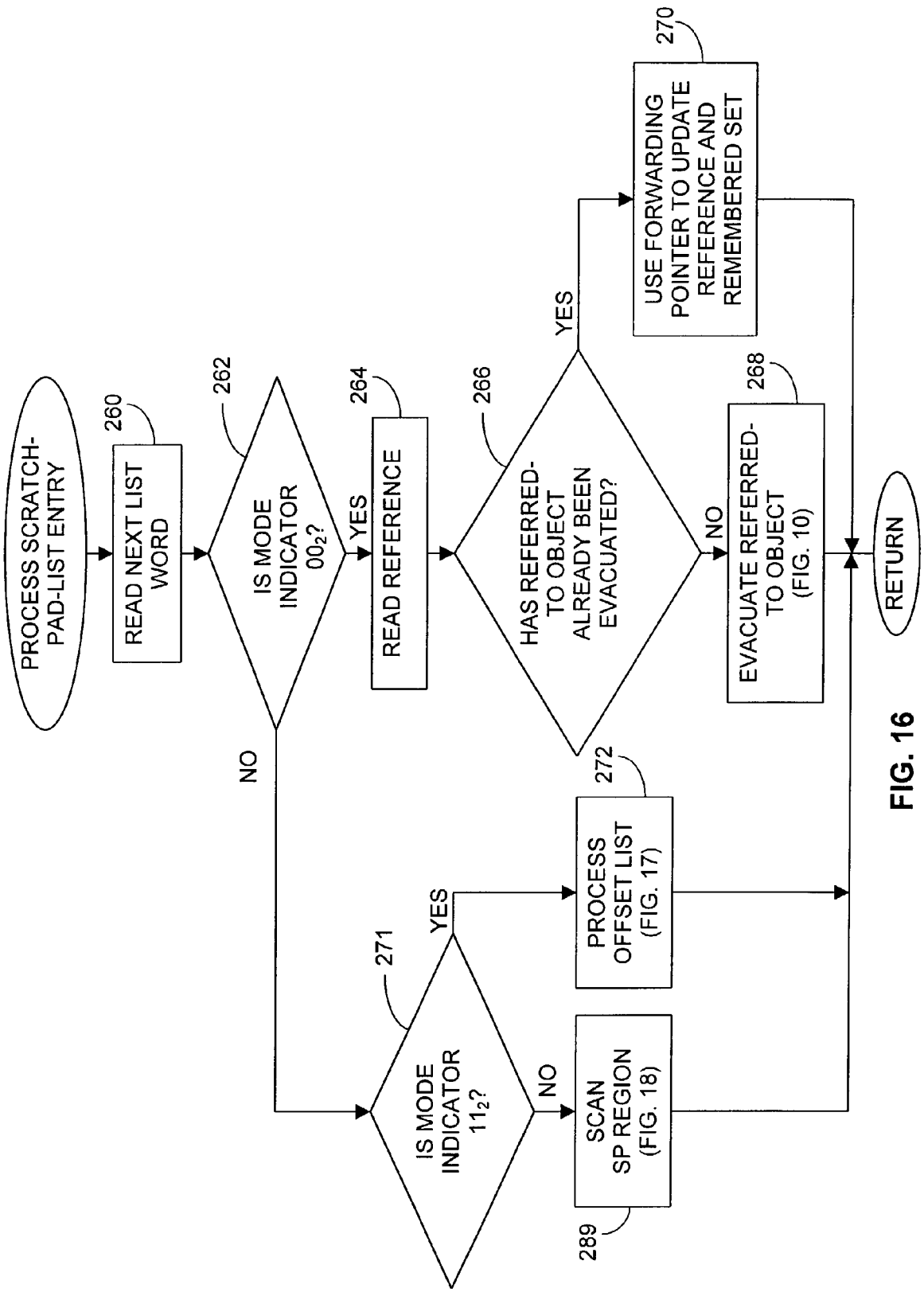
FIG. 16 is a flowchart of a routine for processing scratch-pad-list entries.

So the collector that employs the present invention to generate scratch-pad lists can use any one of a wide range of encoding schemes. When all of the remembered-set entries have thus been processed to produce the scratch-pad lists, the scratch-pad lists are processed, typically in the order discussed above. FIG. 16 illustrates a routine that may be used for each scratch-pad-list entry encoded in accordance with the first embodiment described above. Block 260 represents reading the next word in the scratch-pad list. Blocks 262 and 264 represent thereafter testing that word's mode indicator. If the mode indicator's value is $00_2$, the collector merely reads the reference, as block 264 indicates, and processes it in the normal manner, as blocks 266, 268, and 270 indicate. That is, it evacuates the referred-to object if that object has not already been evacuated. If it has, the collector makes the reference and remembered set reflect the referred-to object's new location.

Figure 17:
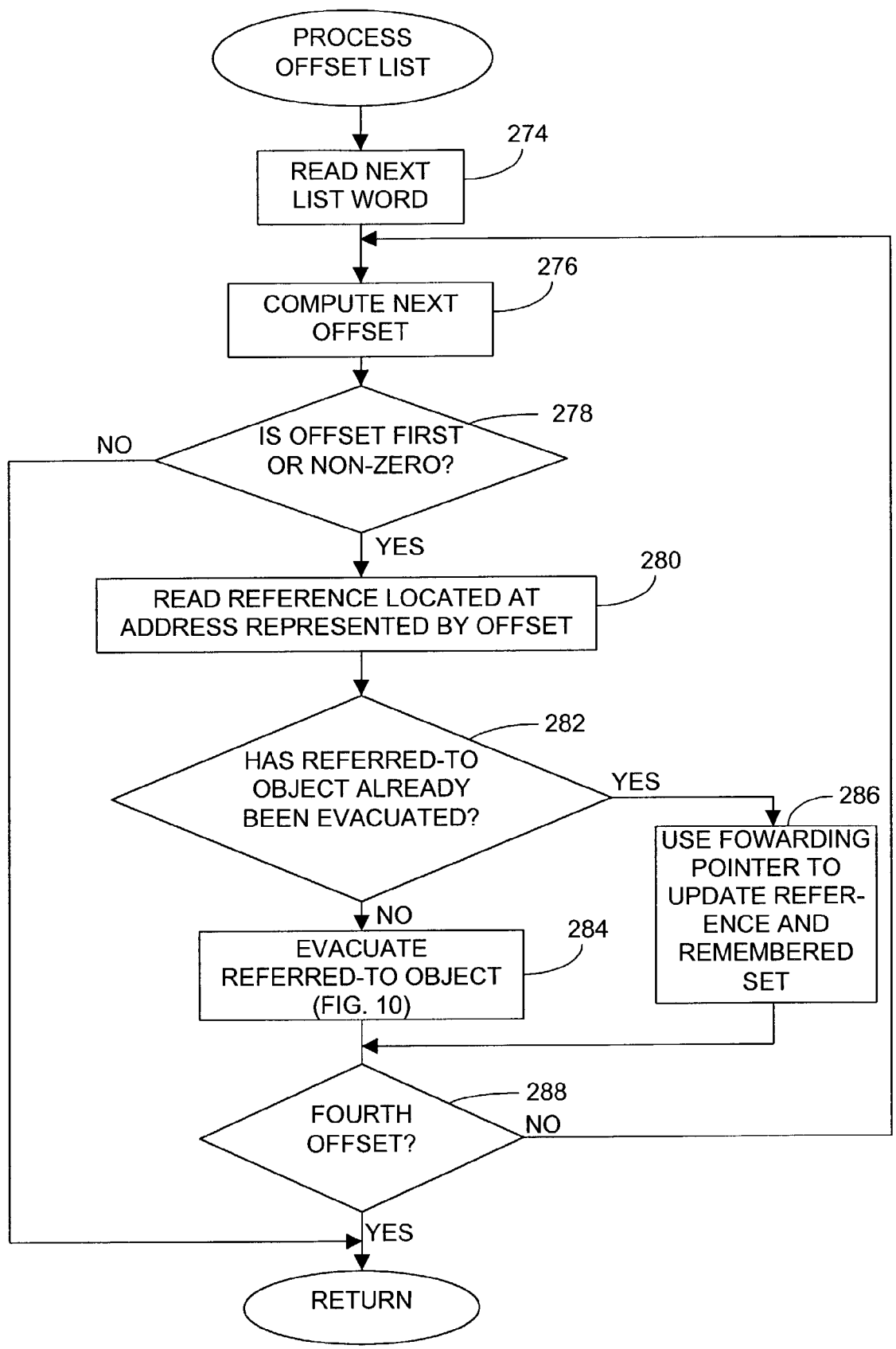
FIG. 17 is a flowchart of a routine for processing an offset list that a scratch-pad-list entry contains.

If the indicator is $11_2$, on the other hand, the collector processes an offset list, as blocks 271 and 272 indicate. FIG. 17 depicts a routine that it may use to do so. As block 274 indicates, it reads the next word in the scratch-pad list, and, as block 276 indicates, it computes the next (initially, the first) offset in that word. In the case of the first offset, the result of the determination represented by block 278 is affirmative. The collector therefore obtains an address from the offset and reads the reference located at that address, as block 280 indicates. The reference is then processed in the normal manner, as blocks 282, 284, and 286 indicate. As blocks 288, 276, and 278 indicate, this continues for each subsequent offset and ends when the fourth offset is processed or an offset of zero is encountered.

Figure 18:
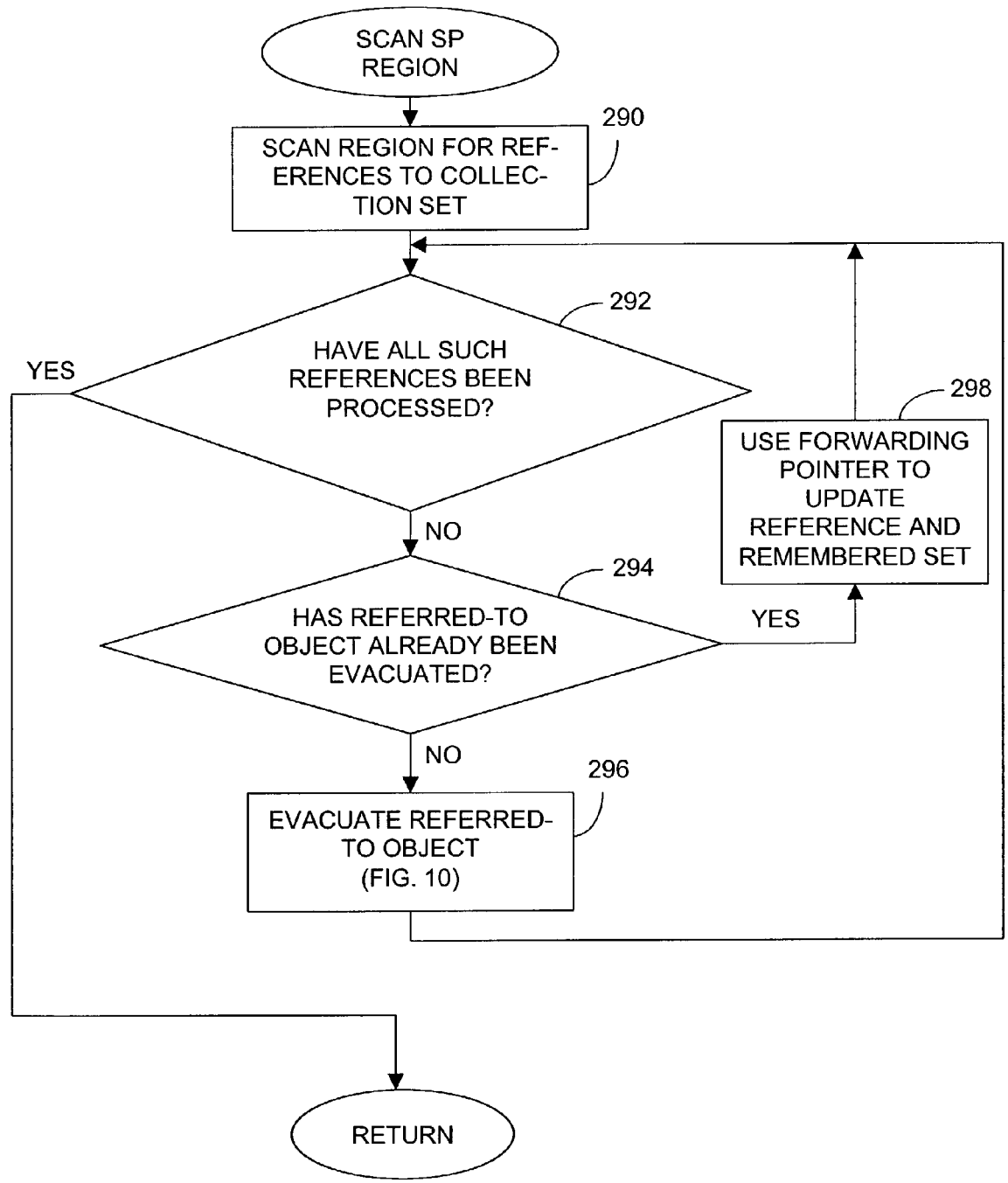
FIG. 18 is a flowchart of a routine for scanning a region that a scratch-pad-list entry represents.

If the result of the determination represented by FIG. 16's block 271 is negative, then the mode indicator is 102. As FIG. 16's block 289 indicates, therefore, the SP region must be scanned. FIG. 18 depicts a routine for doing so. As blocks 290 and 292 indicate, the collector keeps scanning the SP region until it has found all references into the collection set.

As blocks 294 and 296 indicate, it evacuates every such object that it finds if that object has not already been evacuated. If it has been evacuated, that evacuation operation will have left a forwarding pointer, and, as block 298 indicates, the collector uses that forwarding pointer to update both the reference that it found and the remembered set of the car into which that object was evacuated. This completes both FIG. 18's SP-region scanning and FIG. 16's processing of the scratch-pad-list entry.

As is apparent from the foregoing description, use of the present invention's teachings can bound the size of the memory space dedicated to remembered-set processing, limiting that processing to a value that is proportional to the size of the memory space occupied by the remembered set. It therefore limits the memory resources that the collector requires, and it thus constitutes a significant advance in the art.

What is claimed is:

1. A method for employing a computer system, which includes memory of which at least some is used as a heap for dynamic allocation, to perform garbage collection on an incrementally collected generation of the heap in collection increments with which respective collections sets are associated, a method comprising, in each of at least some of the collection increments:
   A) identifying references that are located outside the collection set and refer to objects in the collection set;
   B) creating a reference list of reference-list entries representing references thus identified, each of at least some of the reference-list entries including a location identifier and a mode indicator that indicates whether the location identifier specifies:
      i) an individual-reference location in which a single reference represented by that reference-list entry is located; or
      ii) a region that is sized to contain more than one reference and contains each reference represented by that reference-list entry;
   C) performing an evacuation operation that includes, for each of at least some of the reference-list entries:
      i) identifying each reference represented by that reference-list entry by:
         a) if that reference-list entry's mode indicator indicates that the reference-list entry specifies an individual-reference location, identifying as the reference represented by that reference-list entry the reference that occupies the individual-reference location thereby specified; and
         b) if that reference-list entry's mode indicator indicates that the reference-list entry specifies a region sized to contain more than one reference, identifying as one said reference represented by that reference-list entry each reference that is located in the region thereby specified and refers to an object in the collection set; and
      ii) evacuating from the collection set each object referred to by a reference represented by that reference-list entry or referred to by a reference in an object thereby evacuated; and
   D) reclaiming the memory space occupied by the collection set.

2. A method as defined in claim 1 wherein:
   E) the garbage collection is performed on the incrementally collected generation in accordance with the train algorithm, in which the incrementally collected generation is treated as divided into car sections grouped into trains;
   F) the reference list is a composite reference list divided into constituent reference lists of which each is associated with a different train; and
   G) each collection-set object referred to by a reference represented by reference-list entry in a constituent reference list and not previously evacuated is evacuated to a car section that belongs to the train with which that constituent reference list is associated.

3. A method as defined in claim 1 wherein:
   E) when the mode indicator indicates that the reference-list entry specifies a region sized to contain more than one reference, it further indicates whether the entry additionally indicates where each reference represented by that reference-list entry is located within that region; and
   F) when the mode indicator indicates that the reference-list entry additionally indicates where each reference represented by that reference-list entry is located within that region, the reference-list entry further includes an offset list that indicates where each reference represented by that reference-list entry is located within that region.

4. A method as defined in claim 3 wherein the number of bits of which a reference-list entry consists depends on whether the mode indicator indicates that the reference-list entry additionally indicates where each reference represented by that reference-list entry is located within that region.

5. A method as defined in claim 3 wherein at least some possible values of the mode indicator additionally indicate different numbers of offsets in the offset list.

6. A method as defined in claim 1 wherein the location identifier and mode indicator together consist of the number of bits in an address.

7. A method as defined in claim 1 wherein:
   E) references are so aligned that the least-significant bits of every reference's address contain the same value, whereby a reference's address consists of explicit bits, which vary from reference to reference, and implicit bits, which do not;
   F) regions specified by reference-list identifiers are so aligned that the least-significant bits of every such region's address contain the same value, whereby such a region's address consists of an explicit part, whose contents vary from region to region, and an implicit part, which does not; and
   G) each location identifier consists of a predetermined number of bits and includes each bit of the explicit part of the address of the individual-reference location or region thereby specified but less than each bit of the implicit part thereof.

8. A method as defined in claim 7 wherein the location identifier and mode indicator together consist of the number of bits in an address.

9. A method as defined in claim 1 wherein at least some possible values of the mode indicator additionally indicate different sizes of the region whose location the location identifier specifies.

10. A computer system comprising:
    A) processor circuitry operable to execute processor instructions; and
    B) memory circuitry, to which the processor circuitry is responsive, that contains processor instructions readable by the processor circuitry to configure it to treat at least a portion of the memory as a heap in which dynamic allocation occurs and act as a garbage collector that collects an incrementally collected generation of the heap in increments, with which respective collection sets are associated, by, in each of at least some of the collection increments:
  i) identifying references that are located outside the collection set and refer to objects in the collection set;
  ii) creating a reference list of reference-list entries representing references thus identified, each of at least some of the reference-list entries including a location identifier and a mode indicator that indicates whether the location identifier specifies:
    a) an individual-reference location in which a single reference represented by that reference-list entry; or
    b) a region that is sized to contain more than one reference and contains each reference represented by that reference-list entry;
  iii) performing an evacuation operation that includes, for each reference-list entry:
    a) identifying each reference represented by that reference-list entry by:
      (1) if that reference-list entry's mode indicator indicates that the reference-list entry specifies an individual-reference location, identifying as the reference represented by that reference-list entry the reference that occupies the individual-reference location thereby specified; and
      (2) if that reference-list entry's mode indicator indicates that the reference-list entry specifies a region sized to contain more than one reference, identifying as one said reference represented by that reference-list entry each reference that is located in the region thereby specified and refers to an object in the collection set; and
    b) evacuating from the collection set each object referred to by a reference represented by that reference-list entry or referred to by a reference in an object thereby evacuated; and
  iv) reclaiming the memory space occupied by the collection set.

11. A computer system as defined in claim 10 wherein:
C) the garbage collector collects the incrementally collected generation in accordance with the train algorithm, in which the incrementally collected generation is treated as divided into car sections grouped into trains;
D) the reference list is a composite reference list divided into constituent reference lists of which each is associated with a different train; and
E) each collection-set object referred to by a reference represented by reference-list entry in a constituent reference list and not previously evacuated is evacuated to a car section that belongs to the train with which that constituent reference list is associated.

12. A computer system as defined in claim 10 wherein:
C) when the mode indicator indicates that the reference-list entry specifies a region sized to contain more than one reference, it further indicates whether the entry additionally indicates where each reference represented by that reference-list entry is located within that region; and
D) when the mode indicator indicates that the reference-list entry additionally indicates where each reference represented by that reference-list entry is located within that region, the reference-list entry further includes an offset list that indicates where each reference represented by that reference-list entry is located within that region.

13. A computer system as defined in claim 12 wherein the number of bits of which a reference-list entry consists depends on whether the mode indicator indicates that the reference-list entry additionally indicates where each reference represented by that reference-list entry is located within that region.

14. A computer system as defined in claim 12 wherein at least some possible values of the mode indicator additionally indicate different numbers of offsets in the offset list.

15. A computer system as defined in claim 10 wherein the location identifier and mode indicator together consist of the number of bits in an address.

16. A computer system as defined in claim 10 wherein:
C) references are so aligned that the least-significant bits of every reference's address contain the same value, whereby a reference's address consists of explicit bits, which vary from reference to reference, and implicit bits, which do not;
D) regions specified by reference-list identifiers are so aligned that the least-significant bits of every such region's address contain the same value, whereby such a region's address consists of an explicit part, whose contents vary from region to region, and an implicit part, which does not; and
E) each location identifier consists of a predetermined number of bits and includes each bit of the explicit part of the address of the individual-reference location or region thereby specified but less than each bit of the implicit part thereof.

17. A computer system as defined in claim 16 wherein the location identifier and mode indicator together consist of the number of bits in an address.

18. A computer system as defined in claim 10 wherein at least some possible values of the mode indicator additionally indicate different sizes of the region whose location the location identifier specifies.

19. A storage medium containing instructions readable by a computer system that includes memory to configure the computer system to treat at least a portion of the memory as a heap in which dynamic allocation occurs and act as a garbage collector that collects an incrementally collected generation of the heap in increments, with which respective collection sets are associated, by, in each of at least some of the collection increments:
  A) identifying references that are located outside the collection set and refer to objects in the collection set;
  B) creating a reference list of reference-list entries representing references thus identified, each of at least some of the reference-list entries including a location identifier and a mode indicator that indicates whether the location identifier specifies:
    i) an individual-reference location in which a single reference represented by that reference-list entry; or
    ii) a region that is sized to contain more than one reference and contains each reference represented by that reference-list entry;
  C) performing an evacuation operation that includes, for each reference-list entry:
    i) identifying each reference represented by that reference-list entry by:
      a) if that reference-list entry's mode indicator indicates that the reference-list entry specifies an individual-reference location, identifying as the reference represented by that reference-list entry the reference that occupies the individual-reference location thereby specified; and b) if that reference-list entry's mode indicator indicates that the reference-list entry specifies a region sized to contain more than one reference, identifying as one said reference represented by that reference-list entry each reference that is located in the region thereby specified and refers to an object in the collection set; and ii) evacuating from the collection set each object referred to by a reference represented by that reference-list entry or referred to by a reference in an object thereby evacuated; and D) reclaiming the memory space occupied by the collection set.

20. A storage medium as defined in claim 19 wherein:

E) the garbage collector collects the incrementally collected generation in accordance with the train algorithm, in which the incrementally collected generation is treated as divided into car sections grouped into trains;

F) the reference list is a composite reference list divided into constituent reference lists of which each is associated with a different train; and G) each collection-set object referred to by a reference represented by reference-list entry in a constituent reference list and not previously evacuated is evacuated to a car section that belongs to the train with which that constituent reference list is associated.

21. A storage medium as defined in claim 19 wherein:

E) when the mode indicator indicates that the reference-list entry specifies a region sized to contain more than one reference, it further indicates whether the entry additionally indicates where each reference represented by that reference-list entry is located within that region; and F) when the mode indicator indicates that the reference-list entry additionally indicates where each reference represented by that reference-list entry is located within that region, the reference-list entry further includes an offset list that indicates where each reference represented by that reference-list entry is located within that region.

22. A storage medium as defined in claim 21 wherein the number of bits of which a reference-list entry consists depends on whether the mode indicator indicates that the reference-list entry additionally indicates where each reference represented by that reference-list entry is located within that region.

23. A storage medium as defined in claim 21 wherein at least some possible values of the mode indicator additionally indicate different numbers of offsets in the offset list.

24. A storage medium as defined in claim 19 wherein the location identifier and mode indicator together consist of the number of bits in an address.

25. A storage medium as defined in claim 19 wherein:

E) references are so aligned that the least-significant bits of every reference's address contain the same value, whereby a reference's address consists of explicit bits, which vary from reference to reference, and implicit bits, which do not;

F) regions specified by reference-list identifiers are so aligned that the least-significant bits of every such region's address contain the same value, whereby such a region's address consists of an explicit part, whose contents vary from region to region, and an implicit part, which does not; and G) each location identifier consists of a predetermined number of bits and includes each bit of the explicit part of the address of the individual-reference location or region thereby specified but less than each bit of the implicit part thereof.

26. A storage medium as defined in claim 25 wherein the location identifier and mode indicator together consist of the number of bits in an address.

27. A storage medium as defined in claim 19 wherein at least some possible values of the mode indicator additionally indicate different sizes of the region whose location the location identifier specifies.

28. A garbage collector operating in the memory of a computer system for collecting an incrementally collected generation of a heap portion of the computer system's memory, where dynamic allocation occurs, in collection increments, with which respective collection sets are associated, a garbage collector comprising:

A) means for identifying references that are located outside the collection set and refer to objects in the collection set;

B) means for creating a reference list of reference-list entries representing references thus identified, each of at least some of the reference-list entries including a location identifier and a mode indicator that indicates whether the location identifier specifies:

i) an individual-reference location in which a single reference represented by that reference-list entry; or ii) a region that is sized to contain more than one reference and contains each reference represented by that reference-list entry;

C) means for performing an evacuation operation that includes, for each reference-list entry:

i) identifying each reference represented by that reference-list entry by:

a) if that reference-list entry's mode indicator indicates that the reference-list entry specifies an individual-reference location, identifying as the reference represented by that reference-list entry the reference that occupies the individual-reference location thereby specified; and b) if that reference-list entry's mode indicator indicates that the reference-list entry specifies a region sized to contain more than one reference, identifying as one said reference represented by that reference-list entry each reference that is located in the region thereby specified and refers to an object in the collection set; and ii) evacuating from the collection set each object referred to by a reference represented by that reference-list entry or referred to by a reference in an object thereby evacuated; and D) means for reclaiming the memory space occupied by the collection set.

* * * * *